US008719707B2

(12) United States Patent (10) Patent No.: US 8,719,707 B2
Chowdhury et al. (45) Date of Patent: May 6, 2014

(54) AUDIO AND/OR VIDEO SCENE DETECTION AND RETRIEVAL

(75) Inventors: Abdur R. Chowdhury, Oakton, VA (US); Harmannus Vandermolen, Leesburg, VA (US)

(73) Assignee: Mercury Kingdom Assets Limited, Road Town, Tortola (VG)

( * ) Notice: Subject to any disclaimer, the term of this patent is extended or adjusted under 35 U.S.C. 154(b) by 0 days.

(21) Appl. No.: 13/404,610

(22) Filed: Feb. 24, 2012

(65) Prior Publication Data

US 2012/0150907 A1 Jun. 14, 2012

Related U.S. Application Data

(63) Continuation of application No. 11/470,575, filed on Sep. 6, 2006, now Pat. No. 8,132,103, and a continuation-in-part of application No. 11/321,044, filed on Dec. 30, 2005.

(60) Provisional application No. 60/807,764, filed on Jul. 19, 2006, provisional application No. 60/740,276, filed on Nov. 29, 2005.

(51) Int. Cl.
*G06F 3/00* (2006.01)
*G06F 3/01* (2006.01)

(52) U.S. Cl.
USPC ........... 715/723; 715/717; 715/720; 715/721; 715/724; 715/725

(58) Field of Classification Search
USPC ......... 715/714, 717, 738, 745, 762, 763, 810, 715/811, 825, 720, 721, 723, 724, 725
See application file for complete search history.

(56) References Cited

U.S. PATENT DOCUMENTS

| 5,751,286 A | 5/1998 | Barber et al. |
| 5,828,839 A | 10/1998 | Moncreiff |
| 5,835,087 A * | 11/1998 | Herz et al. ..................... 715/810 |
| 5,905,981 A | 5/1999 | Lawler |
| 5,907,837 A | 5/1999 | Ferrel et al. |
| 6,049,806 A | 4/2000 | Crecine |

(Continued)

OTHER PUBLICATIONS

Baker L. "Blinkx.TV: More Video Than Google Yahoo or YouTube" Search Engine Journal Jun. 14, 2006 pp. 1-7 http://www.searchenginjournal.com/binkxtv-more-video-than-google-yahoo-or-myspace/3532 (Visited Mar. 5, 2008).

(Continued)

*Primary Examiner* — Nicholas Augustine
(74) *Attorney, Agent, or Firm* — Lee & Hayes, PLLC

(57) ABSTRACT

Movie video trailers for a particular movie quote may be created and provided to a user. The Internet may be searched to identify documents that likely include references to a movie. A reference to the movie within an identified document may be detected and determined to be a movie quote. The movie quote and related information may be extracted from the identified document. A location of the movie quote within the movie may be determined. A movie video trailer that includes the movie quote may be created based on the location of the movie quote. A request for a movie video trailer that includes a movie quote or a partial movie quote, specified by the user, may be received from the user. A movie video trailer that includes the movie quote or the partial movie quote may be identified and provided to the user.

20 Claims, 17 Drawing Sheets

(56) References Cited

U.S. PATENT DOCUMENTS

| | | | |
|---|---|---|---|
| 6,112,203 A | 8/2000 | Bharat et al. | |
| 6,166,735 A | 12/2000 | Dom et al. | |
| 6,327,590 B1* | 12/2001 | Chidlovskii et al. | 707/734 |
| 6,385,602 B1* | 5/2002 | Tso et al. | 1/1 |
| 6,681,370 B2 | 1/2004 | Gounares et al. | |
| 6,691,106 B1 | 2/2004 | Sathyanarayan | |
| 6,714,909 B1 | 3/2004 | Gibbon et al. | |
| 6,823,370 B1 | 11/2004 | Kredo et al. | |
| 6,901,207 B1* | 5/2005 | Watkins | 386/314 |
| 6,963,867 B2* | 11/2005 | Ford et al. | 707/752 |
| 7,209,942 B1* | 4/2007 | Hori et al. | 709/203 |
| 7,281,220 B1 | 10/2007 | Rashkovskly | |
| 7,367,043 B2 | 4/2008 | Dudkiewicz et al. | |
| 7,440,976 B2 | 10/2008 | Hart et al. | |
| 2002/0069218 A1* | 6/2002 | Sull et al. | 707/501.1 |
| 2002/0133826 A1 | 9/2002 | Ohyama | |
| 2002/0184336 A1 | 12/2002 | Rising, III | |
| 2003/0093790 A1 | 5/2003 | Logan et al. | |
| 2003/0182220 A1 | 9/2003 | Galant | |
| 2003/0235407 A1 | 12/2003 | Lord | |
| 2004/0059720 A1 | 3/2004 | Rodriguez | |
| 2004/0098754 A1 | 5/2004 | Vella et al. | |
| 2004/0114571 A1 | 6/2004 | Timmins et al. | |
| 2004/0220926 A1* | 11/2004 | Lamkin et al. | 707/3 |
| 2005/0091694 A1 | 4/2005 | Rambo | |
| 2005/0114324 A1 | 5/2005 | Mayer | |
| 2005/0114449 A1 | 5/2005 | Vergaeghe et al. | |
| 2005/0128361 A1 | 6/2005 | Li et al. | |
| 2005/0144086 A1 | 6/2005 | Speiser et al. | |
| 2006/0059134 A1 | 3/2006 | Palmon et al. | |
| 2006/0071950 A1 | 4/2006 | Kurtzweil et al. | |
| 2006/0167857 A1 | 7/2006 | Kraft et al. | |
| 2006/0167864 A1 | 7/2006 | Bailey et al. | |
| 2006/0179051 A1 | 8/2006 | Whitney et al. | |
| 2006/0218573 A1 | 9/2006 | Proebstel | |
| 2006/0224552 A1 | 10/2006 | Riezler et al. | |
| 2007/0005564 A1 | 1/2007 | Zehner | |
| 2007/0088603 A1 | 4/2007 | Jouppi et al. | |
| 2007/0094247 A1 | 4/2007 | Chowdhury et al. | |
| 2007/0112817 A1 | 5/2007 | Danniger | |
| 2007/0130563 A1 | 6/2007 | Elgazzar et al. | |
| 2007/0143778 A1* | 6/2007 | Covell et al. | 725/19 |
| 2007/0156677 A1 | 7/2007 | Szabo | |
| 2007/0208719 A1 | 9/2007 | Tran | |
| 2007/0226183 A1 | 9/2007 | Hart et al. | |
| 2007/0261099 A1 | 11/2007 | Broussard et al. | |
| 2007/0300258 A1 | 12/2007 | O'Connor et al. | |
| 2008/0005118 A1 | 1/2008 | Shakib et al. | |
| 2008/0155627 A1 | 6/2008 | O'Connor et al. | |

OTHER PUBLICATIONS

Mefeedia blog: How to create Quicktime movie quotes, Feb. 7, 2005, http://mefeedia.com/blog/2005/07/2, pp. 1-3.

International Search Report issued in International Application No. PCT/US07/73999, dated Jul. 7, 2008, 8 pages.

Adamic et al., "how to search a social network" social networks 27 (2005) 187-203, HP Labs, 1501 Page Mill Road, Palo Alto, CA 94304, USA www.esevier.com/locate/socnet (c) 2005 Elsevier B.V.

Agichtein et al., Improving Web Search Ranking by Incorporating User Behavior Information, SIGIR '06, Aug. 6-11, 2006, Seattle, Washington, USA Copyright 2006 ACM, pp. 19-26.

Joho et al., Effectiveness of Additional Representations for the Search Result Presentation of the Web, Joho, H. and Jose, J.M. (2005). A Comparative Study of the Effectiveness of Search Results Presentation on the Web. In: Lalmas, M., et al. (Eds.) Advances in Information Retrieval, 28$^{th}$ European Conference on Information Retrieval, pp. 302-313, L.

Lang, A tolerance Rough Set Approach to Clustering Web Search Results, Institute of Mathematics Faculty of Mathematics, Informatics and Mechanics Warsaw University, Dec. 2003, pp. 1-77.

\* cited by examiner

| Quote | Words | Character | Actor | Movie | Year | Reference Counter |
|---|---|---|---|---|---|---|
| "E.T. phone home." | ET; phone; home | E.T. | E.T. | E.T. The Extraterrestrial | 1982 | 1000 |
| "Frankly, my dear, I don't give a damn." | frankly; my; dear; I; don't; give; a; damn | Rhett Butler | Clark Gable | Gone With The Wind | 1939 | 1500 |
| "I'll be back." | I'll; be; back | The Terminator | Arnold Schwarzenneger | The Terminator | 1984 | 900 |
| "I'm going to make him an offer he can't refuse." | I'm; going; to; make; him; an; offer; he; can't; refuse | Don Corleone | Marlon Brando | The Godfather | 1972 | 9000 |
| "Nobody puts Baby in a corner." | nobody; puts; baby; in; a; corner | Johnny Castle | Patrick Swayze | Dirty Dancing | 1987 | 750 |
| "What's the matter, Colonel Sandurz? CHICKEN?" | what's; the; matter; colonel; sandurz; chicken | Dark Helmet | Rick Moranis | Spaceballs | 1987 | 60 |
| "Soylent Green is people." | soylent; green; is; people | Det. Thorn | Charlton Heston | Soylent Green | 1973 | 90 |
| "Toto, I've a feeling we're not in Kansas anymore." | Toto; I've; a; feeling; we're; not; in; Kansas; anymore | Dorothy | Judy Garland | The Wizard of Oz | 1939 | 6500 |

The Honorees Are...

| # | Quote | Movie | Year |
|---|---|---|---|
| 1 | Frankly, my dear, I don't give a damn. | GONE WITH THE WIND | 1939 |
| 2 | I'm going to make him an offer he can't refuse. | THE GODFATHER | 1972 |
| 3 | You don't understand! I coulda had class. I coulda been a contender. I could've been somebody, instead of a bum, which is what I am. | ON THE WATERFRONT | 1954 |
| 4 | Toto, I've got a feeling we're not in Kansas anymore. | THE WIZARD OF OZ | 1939 |
| 5 | Here's looking at you, kid. | CASABLANCA | 1942 |
| 6 | Go ahead, make my day. | SUDDEN IMPACT | 1983 |
| 7 | All right, Mr. DeMille, I'm ready for my close-up. | SUNSET BLVD. | 1950 |
| 8 | May the Force be with you. | STAR WARS | 1977 |
| 9 | Fasten your seatbelts. It's going to be a bumpy night. | ALL ABOUT EVE | 1950 |
| 10 | You talking to me? | TAXI DRIVER | 1976 |
| 11 | What we've got here is failure to communicate. | COOL HAND LUKE | 1967 |
| 12 | I love the smell of napalm in the morning. | APOCALYPSE NOW | 1979 |
| 13 | Love means never having to say you're sorry. | LOVE STORY | 1970 |
| 14 | The stuff that dreams are made of. | THE MALTESE FALCON | 1941 |

Movie Transcript – The Wizard of Oz

DOROTHY: Toto -- I've a feeling we're not in Kansas anymore.

DOROTHY: We must be over the rainbow!

610

DOROTHY: Now I -- I know we're not in Kansas.

GLINDA: Are you a good witch, or a bad witch?

DOROTHY: Who, me? Why, I'm not a witch at all. I'm Dorothy Gale from Kansas.

GLINDA: Oh! Well....

GLINDA: ...is that the Witch?

DOROTHY: Who, Toto?

DOROTHY: Toto's my dog.

GLINDA: Well, I'm a little muddled. The Munchkins called me because a new witch has just dropped a house on the Wicked Witch of the East. And there's the house, and here you are, and that's all...

GLINDA: ...that's left of the Wicked Witch of the East.

GLINDA: And so what the Munchkins want to know...

GLINDA: ...is, are you a good witch, or a bad witch?

DOROTHY: Oh, but I've already told you, I'm not a witch at all -- witches are old and ugly. What was that?

GLINDA: The Munchkins. They're laughing because I am a witch. I'm Glinda, the Witch of the North.

DOROTHY: You are! Oh, I beg your pardon! But I've never heard of a beautiful...

DOROTHY: ...witch before.

GLINDA: Only bad witches are ugly.

Fig. 6

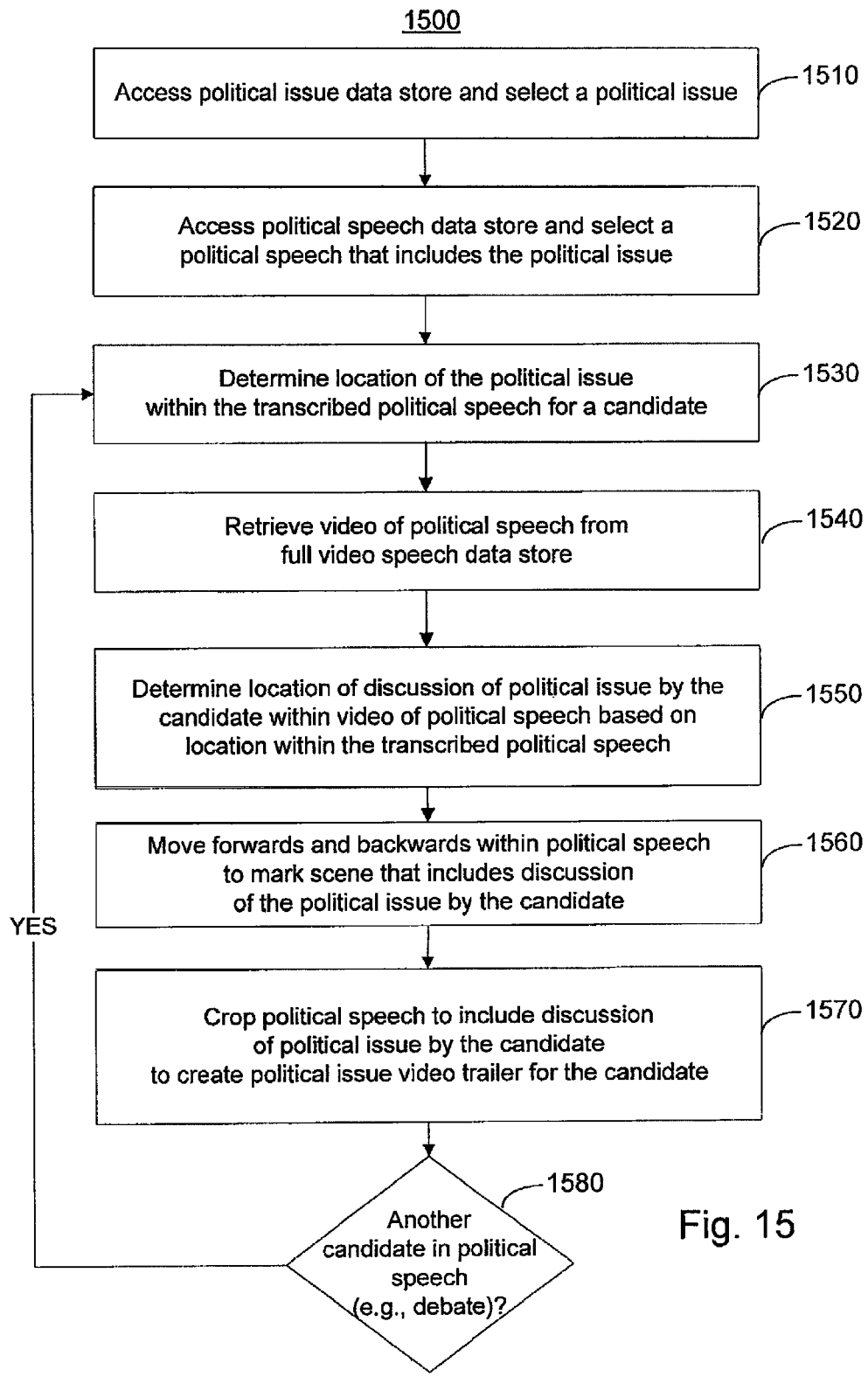

AUDIO AND/OR VIDEO SCENE DETECTION AND RETRIEVAL

CROSS-REFERENCE TO RELATED APPLICATIONS

This application is a continuation of, and claims priority to, U.S. application Ser. No. 11/470,575, filed Sep. 6, 2006 (now allowed), now U.S. Pat. No. 8,132,103 which claims priority to U.S. Provisional Application No. 60/807,764, filed Jul. 19, 2006, and is a continuation-in-part of U.S. application Ser. No. 11/321,044, filed Dec. 30, 2005 (currently pending). The '044 application claims priority to U.S. Provisional Application No. 60/740,276, filed Nov. 29, 2005. Each of the above-referenced applications is expressly incorporated by reference herein in its entirety.

TECHNICAL FIELD

This disclosure relates to audio and/or video scene detection and retrieval.

BACKGROUND

A user may search the Internet for content that may fill a user's information gap or information need. To do so, the user may enter a search query into a search engine and, in response, may receive search results that are relevant to the search query. If the user seeks search results in a particular format, such as, for example, audio or video search results, a user may include one of the words "audio" or "video" in the search query along with words that relate to the content the user seeks.

SUMMARY

In a first general aspect, the Internet is searched to identify documents that are likely to include references to a movie. An identified document is accessed. A reference to the movie is detected within the identified document. The detected reference to the movie is determined to be a movie quote. The movie quote and related information is extracted from the identified document. A location of the movie quote within the movie is determined. A movie video trailer is created from the movie and includes the movie quote based on the determined location of the movie quote.

With respect to at least the first general aspect, implementations may include one or more of the following features. For example, determining that the detected reference to the movie is a movie quote may include using text analysis to determine that the detected reference to the movie is a movie quote. Determining that the detected reference to the movie is a movie quote may include using key words from a transcript of the movie to determine that the detected reference to the movie is a movie quote. Determining that the detected reference to the movie is a movie quote may include using an identified set of key phrases to determine that the detected reference to the movie is a movie quote.

The movie video trailer may exclude at least a portion of other content included in the movie.

Creating the movie video trailer may include tuning to the location in the movie that includes the movie quote, rewinding the movie from the location of the movie quote until a beginning of a scene that includes the movie quote is reached, rewinding the movie past the beginning of the scene by a predetermined amount of time, marking a first time stamp of the movie at the rewound location as a scene start time, returning to the location in the movie of the movie quote, forwarding the movie from the location of the movie quote until an end of the scene that includes the movie quote is reached, forwarding the movie past the end of the scene by a predetermined amount of time, marking a second time stamp of the movie at the forwarded location as a scene end time, removing at least a portion of the content of the movie located before the first time stamp, and removing at least a portion of the content of the movie located after the second time stamp.

The movie video trailer may include a pointer to a portion of the movie that includes the movie quote. The portion of the movie may be made perceivable to the user without requiring the user to view the entire movie.

Determining a location of the movie quote within the movie may include accessing a transcript of the movie, determining a location of the movie quote within the transcript, and identifying a timestamp associated with the location of the movie quote.

In a second general aspect, a movie video trailer is provided to a user. A request for a movie video trailer that includes a movie quote or a partial movie quote specified by the user is received from the user. At least one movie video trailer responsive to the request is identified. The at least one movie video trailer includes the movie quote or the partial movie quote specified by the user. The user is provided with the identified at least one movie video trailer.

With respect to at least the second general aspect, implementations may include one or more of the following features. For example, receiving the request may include receiving a search query inputted by the user for a movie video trailer. The search query may include the movie quote or the partial movie quote.

Identifying at least one movie video trailer responsive to the request may include identifying an existing movie video trailer that is responsive to the request. Identifying at least one movie video trailer responsive to the request may include determining that a movie video trailer that is responsive to the request does not exist and generating a movie video trailer that is responsive to the request on-the-fly.

The request for the movie video trailer may include the partial movie quote. Identifying at least one movie video trailer responsive to the request may include identifying a first movie video trailer associated with a first movie, where the first movie video trailer may include a first movie quote that contains the partial movie quote, and identifying a second movie video trailer associated with a second movie, where the second movie video trailer may include a second movie quote that is distinct from the first movie quote and contains the partial movie quote.

Providing the user with the identified at least one movie video trailer may include determining a popularity of the first movie quote, determining a popularity of the second movie quote, and presenting the first movie video trailer and the second movie video trailer to the user based on the determined popularity of the first movie quote and the second movie quote.

Determining a popularity of the first movie quote may include determining a value of a reference counter associated with the first movie quote. The reference counter may indicate a number of references to the first movie quote on the Internet. Determining a value of the reference counter associated with the first movie quote may include searching the Internet to identify documents that likely include references to movies, accessing an identified document, identifying a reference to the first movie quote within the identified document, and increasing a value of the reference counter associated with the first movie quote in response to identification of the reference to the first movie quote within the identified document.

The reference counter may indicate a combination of the number of references to the first movie quote on the Internet and the number of references to the first movie on the Internet.

Determining a popularity of the first movie quote may include determining a value of a reference counter associated with the first movie. The reference counter may indicate a number of references to the first movie on the Internet.

Providing the first movie video trailer and the second movie video trailer to the user may include presenting the first movie video trailer and the second video trailer in a grouping that is ordered based on the determined popularity of the first movie quote and the second movie quote. The grouping may be a list that presents the first movie trailer and the second movie trailer in a ranked order based on the determined popularity of the first movie quote and the second movie quote.

The request for the movie video trailer may include the movie quote. Identifying at least one movie video trailer responsive to the request may include identifying a first movie video trailer associated with a first movie, where the first movie video trailer may include the movie quote and identifying a second movie video trailer associated with a second movie, where the second movie video trailer may include a second movie quote that is distinct from the first movie quote and contains the movie quote.

Providing the user with the identified at least one movie video trailer may include determining a popularity of the first movie, determining a popularity of the second movie, and presenting the first movie video trailer and the second movie video trailer to the user based on the determined popularity of the first movie and the second movie.

Determining a popularity of the first movie may include determining a value of a reference counter associated with the first movie. The reference counter may indicate a number of references to the first movie on the Internet. Determining a value of the reference counter associated with the first movie may include searching the Internet to identify documents that likely include references to movies, accessing an identified document, identifying a reference to the first movie within the identified document, and increasing a value of the reference counter associated with the first movie in response to identification of the reference to the first movie within the identified document.

Presenting the first movie video trailer and the second movie video trailer to the user may include presenting the first movie video trailer and the second video trailer in a grouping that is ordered based on the determined popularity of the first movie and the second movie. The grouping may be a list that presents the first movie trailer and the second movie trailer in a ranked order based on the determined popularity of the first movie and the second movie.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 2 is an illustration of an exemplary movie quote index data store.

FIGS. 4A and 4B are illustrations of web pages that include references to movies.

FIG. 6 is an illustration of an exemplary movie transcript.

FIG. 15 is a flow chart of an exemplary process for creating a political issue video trailer for a particular political candidate's stance on a particular political issue.

DETAILED DESCRIPTION

Users often seek to identify, recall and/or locate specific quotes from audio and/or video ("audio/video") content, and increasingly also seek to identify, recall and/or locate scenes from video content, for instance, a user may wish to find a scene within a previously-viewed video to enable the user's repeat viewing, the user's sharing of the scene with others, or the user's use of the scene for some other purpose, such as, for example, to create a montage of the user's favorite audio/video scenes. The technology described in this disclosure may be configured to, among other things, search the Internet (or aggregations of Internet content) for quotes from audio and/or video content that have been referenced on the Internet, whether in web pages or elsewhere on the Internet. Once audio/video quotes have been identified, the technology contemplates scene detection analysis that is capable of determining (within the full content of the audio or video) the beginning and end of a scene that includes the content identified by the search, and if desired, creation of an audio/video trailer that includes the scene.

Multiple methods are contemplated for creating a video trailer that includes a scene having an identified quote. For example, a user may enter a video search query while seeking information (e.g., a video trailer) for a particular quote, and thus inspire creation of a video trailer containing the sought after quote. Additionally or alternatively, video trailer creation may be inspired or triggered based on a determination that an excerpt is referenced a threshold number of times on the Internet (e.g., during a desired time period or in absolute) or based on a determination that the number of references to an excerpt is increasing at a rate that exceeds a threshold rate. In this case, video trailers may be created prior to receiving a search query from a user requesting a video trailer related to a particular quote or scene.

Quotes may be deemed to be highly referenced when a threshold number of documents, such as web pages, make reference to the quote, such as, for example, by reproducing the quote, either in part or in its entirety, by annotating the quote with information from audio/video content that includes the quote or the scene to which the quote belongs, or by adding commentary or discussion about the quote. The audio/video content (e.g., media assets) may include movies, television shows, political speeches, sports events and commercials. However, for illustrative purposes, the following implementations focus on media assets that include movies and movie quotes, as well as media assets that include political speeches and political issues.

Moreover, techniques are described for identifying key scenes in various types of video, such as movies, associating metadata with these scenes, indexing the scenes to facilitate searching, and retrieving and ranking relevant scenes as the result of user queries.

Figure 1A:
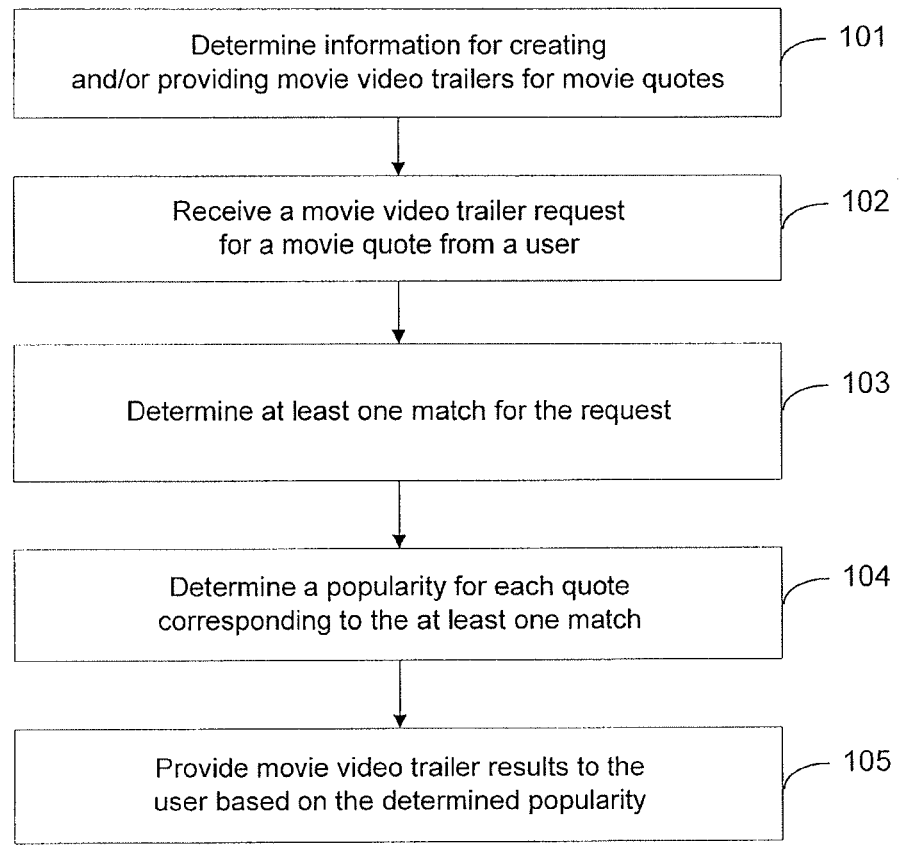
FIG. 1A is a flow chart of an exemplary process for providing movie video trailers to a user in response to a request for a movie video trailer.

FIG. 1A is a flow chart of an exemplary process 100A for providing movie video trailers to a user in response to a request for a movie video trailer. Generally, the operations of process 100A may be performed by a search system, such as, for example, the search system 130 of FIG. 1B, as described in move detail below. For convenience, the process 100A is referenced as being performed by the search system 130. However, similar methodologies may be applied in other implementations where different components are used to define the structure of the system 100B of FIG. 1B, or where the functionality is distributed differently among the components shown in FIG. 1B.

The search system 130 determines information for creating and/or providing movie video trailers for movie quotes (101). The search system 130 may determine and store various types of information before movie video trailers can be created or identified in response to a movie video trailer request. For example, the search system 130 may generate and store an index of information related to movie quotes (e.g., a quote, a character who said the quote and an actor who played the character) and corresponding movies. The index also may include popularity information related to how often a particular movie quote is referenced on the Internet.

The search system 130 also may store movie transcripts. If a movie transcript is already in existence, the search system 130 may locate the movie transcript on the Internet or elsewhere, or additionally or alternatively, the search system 130 may receive the transcript as provided by a user. If a movie transcript is not already in existence, the search system 130 may generate a movie transcript by performing, for example, speech-to-text processing on an audio track for a movie.

The search system 130 also may store full video of movies, from which the search system 130 may create movie video trailers for particular scenes that include a movie quote. The full video of movies may be stored at a location that is locally accessible by the search system 130, or rather, stored at other locations (e.g., a remote server on the Internet), and referenced by the search system 130 for later access.

Furthermore, the search system 130 may store movie video trailers that have already been created, by the search system 130 or some other system. The movie video trailers also may be stored at a location that enables local access by the search system 130, or rather, stored at some other location (e.g., a remote server on the Internet) and referenced by the search system 130 for later access.

The search system 130 receives a movie video trailer request for a movie quote from a user (102). For example, the search system 130 may receive a search query that includes the phrase "Soylent Green is people," which is a quote from the movie Soylent Green. Alternatively, the search system 130 may receive a selection by a user of a pre-created movie video trailer of, for example, a scene that includes the quote "Soylent Green is people." The pre-created movie video trailer may be selected by the user from a list of pre-created movie video trailers provided to the user via a user interface (UI) in a browser window or other application.

The search system 130 determines at least one match for the request (103). The search system 130 may access the information determined in operation 101 to identify a match for a search query of, for example, "Soylent Green is people." To do so, the search system 130 may determine if a movie video trailer for the quote already exists, and if so, identify the existing movie video trailer as a match. If a movie video trailer does not already exist for the quote, the search system 130 may create one, as described in detail below.

Alternatively, if the movie video trailer request was a selection of a pre-created movie video trailer, the search system 130 may identify the movie video trailer that corresponds to the selection as a match.

In some implementations, more than one match may be determined by the search system 130. For example, two movies may include the phrase "Soylent Green is people," and as such, two movie video trailers, each including a scene that includes the quote from each movie, may be identified as matches for the movie video trailer request.

The search system 130 determines a popularity for each quote corresponding to the at least one match (104). To do so, the search system 130 may access the information determined in operation 101 and to determine popularity information for the quotes. If no such popularity information exists for a particular quote, the search system 130 may identify popularity information (e.g., how many times the particular quote is referenced on the Internet) on-the-fly.

The search system 130 provides movie video trailer results to the user based on the determined popularity (105). For example, the user may receive search results related to the two different matches identified previously. The search results may be presented in a manner such that a search result corresponding to a more popular quote may be presented in a manner that is more visually prominent, such as, for example, at the top of a search result list or identified as popular by words or a symbol, than search results that correspond to less popular quotes.

Figure 1B:
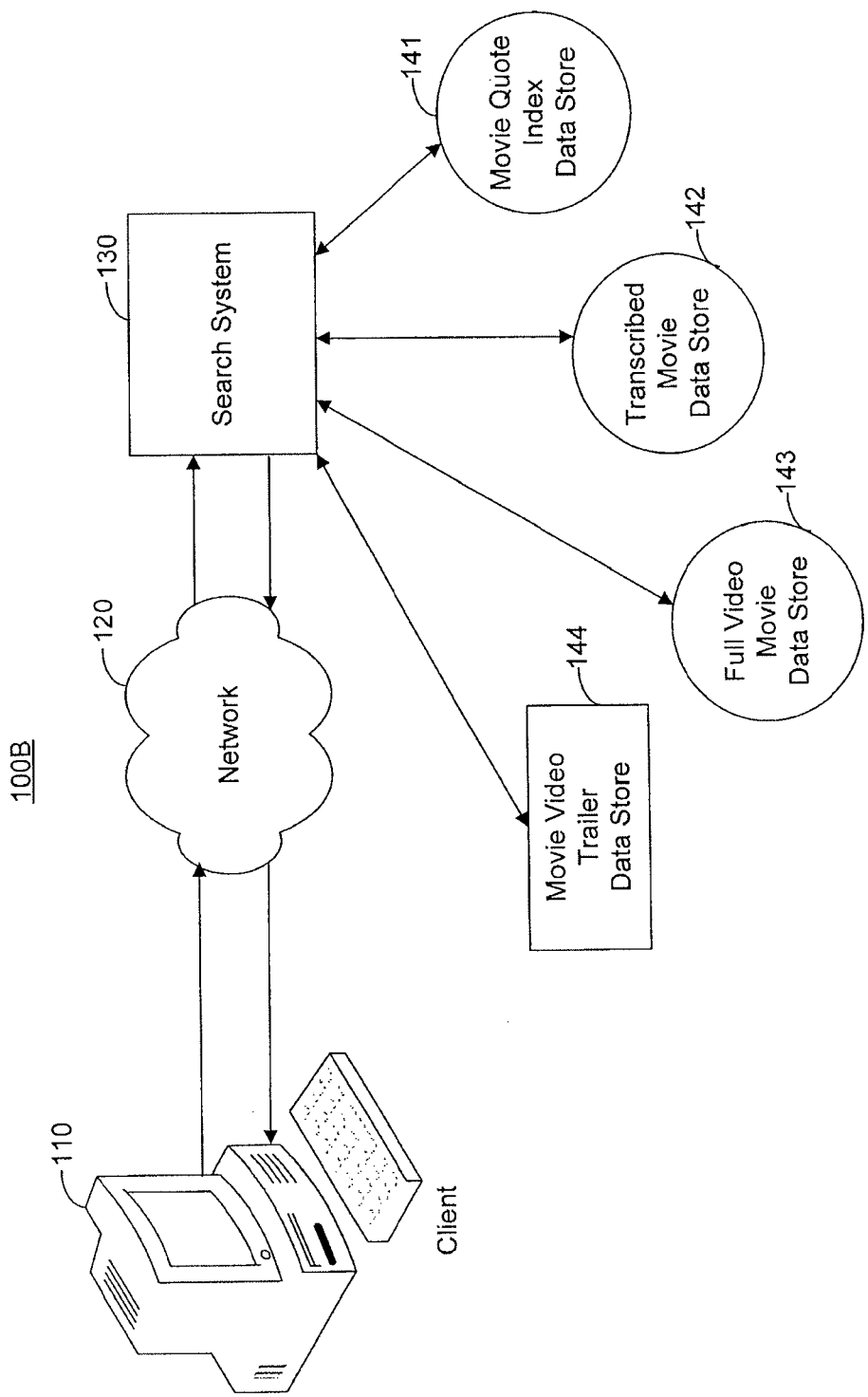
FIGS. 1B and 11 are block diagrams of two exemplary communications systems.

FIG. 1B is a block diagram of an exemplary communications system 100B that includes a client 110 connected to a search system 130 through a network 120. The client 110 may be configured to enable a user to perceive one or more movie video trailers in response to the user requesting creation of a trailer for a particular movie quote or in response to a user selecting a previously created movie video trailer. The client 110 may receive the movie video trailer from the search system 130 through the network 120.

Each of the client 110 and the search system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and search system 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the search system 130.

The client 110 may include one or more devices capable of accessing content on the search system 130. The search system 130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, an email application, an instant messaging client, an Internet service provider client, a media player, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

The network 120 includes hardware and/or software capable of enabling direct or indirect communications between the client 110 and the search system 130. As such, the network 120 may include a direct link between the client 110 and the search system 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The search system 130 may include a general-purpose computer having a central processor unit (CPU), and memory/storage devices that store data and various programs such as an operating system and one or more application programs. Other examples of a search system 130 includes a workstation, a server, a special purpose device or component, a broadcast system, other equipment, or some combination thereof capable of responding to and executing instructions in a defined manner. The search system 130 also may include an input/output (I/O) device (e.g., video and audio input and conversion capability), and peripheral equipment such as a communications card or device (e.g., a modem or a network adapter) for exchanging data with the network 120, and ultimately, for providing content to the client 110.

The search system 130 is generally capable of executing instructions under the command of a controller (not separately shown). The controller may be implemented by a software application loaded on the search system 130 for commanding and directing communications exchanged with the client 110. Other examples of the controller include a program, a piece of code, an instruction, a device, a computer, a computer system, or a combination thereof, for independently or collectively instructing the client 110 or the search system 130 to interact and operate as described. The search system 130 may be embodied permanently or temporarily in any type of machine, component, physical or virtual equipment, storage medium, or propagated signal capable of providing instructions to the client 110 or the search system 130.

To provide the client 110 with a movie video trailer, the search system 130 may be configured to access a movie quote index data store 141, a transcribed movie data store 142, a full video movie data store 143 and a movie video trailer data store 144.

The movie quote index data store 141 may include a movie quote index, such as, for example the exemplary movie quote index 200, as illustrated in FIG. 2. The movie quote index 200 includes movie quotes 210, words associated with each quote 220, a character who spoke each quote 230, an actor who played the speaking character 240, a title of the movie in which each quote appears 250, a year each movie was released 260 and a reference counter that indicates a number of references to each quote on the Internet 270.

Because movie quotes often include words that would normally not be considered keywords for a particular piece of content (e.g., the quote "I'll be back"), the index may include all terms within the quote, rather than just keywords from the quote. However, in some implementations, only keywords may be stored in movie quote index 200, where common words, such as, for example, "the" and "a" may be removed to save storage space. For example, the keywords "I'll" and "back" may be stored for the quote "I'll be back."

Additionally, or alternatively, movie quote index 200 may include a movie reference counter that is related to a number of references to a particular movie on the Internet.

In an exemplary entry 300 in movie quote index 200, the movie quote "I'll be back" may include the words "I'll," "be" and "back." The character who said "I'll be back" is The Terminator in the movie of the same name that was released in 1984. The Terminator was played by Arnold Schwarzenegger. The quote "I'll be back" has been referenced on the Internet 900 times.

In some implementations, the movie quote index 200 may include positional information for a particular quote. The positional information may include a location of a quote within a larger paragraph, group of sentences or the entire movie to which the movie quote belongs. The location information may include a timestamp or other reference. As such, inclusion of positional information may enable the search system 130 to identify a location of a particular quote within its corresponding movie.

Figure 3:
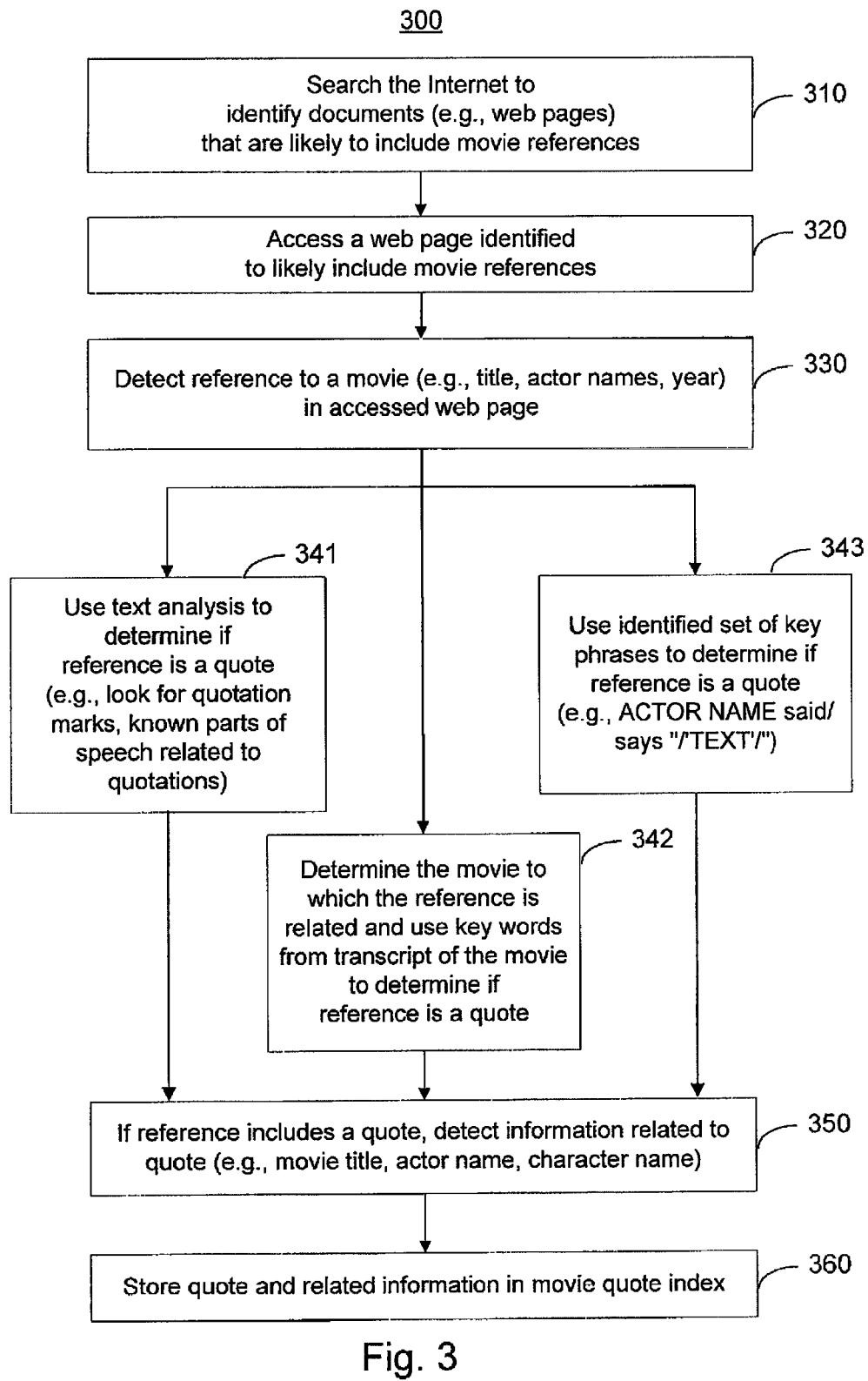
FIG. 3 is a flow chart of an exemplary process for detecting and storing movie quotes to create a movie quote index.

FIG. 3 is a flow chart of an exemplary process 300 for detecting and storing movie quotes found on the Internet to create a movie quote index, such as, for example, movie quote index 200 of FIG. 2. Generally, the operations of process 300 may be used in conjunction with the systems and configurations described earlier in FIG. 1B. For example, process 300 may be performed by the search system 130, and for convenience, the search system 130 is referenced as performing the process. However, similar methodologies may be applied in other implementations where different components are used to define the structure of the system, or where the functionality is distributed differently among the components shown.

The search system 130 searches the Internet to identify web pages that are likely to include movie references (310). The search system 130 may be seeded with information related to determining if content on the Internet is likely to include movie references, such as, for example, movie titles, names of movie awards and names of famous actors. If one of the seed movie-related words appears in a web page, the search system 130 may determine that the web page includes a movie reference. For example, a web page that includes the statement "Its obvious why Gone with the Wind won the Best Picture Oscar in 1939" uses multiple movie-related words and phrases, such as a movie title (i.e., Gone with the Wind)

and a movie award (i.e., Oscar and Best Picture), and, thus may be determined to be a web page that is likely to include a movie reference.

In some implementations, rather than searching the Internet for movie references, the search system 130 may crawl the Internet through a focused crawling algorithm. In general, a crawler is a program that retrieves web pages and builds very large data stores that include the retrieved web pages. Focused crawling may enable detection of information from within only particular topical (referred to as "focused") portions of the Internet. A focused crawling algorithm may load a particular web page and extract all links found within the web page. The focused crawling algorithm may rate the extracted links based on keywords or other information, such as that described above with respect to seeding the search system 130, to determine which web page to retrieve next. Link by link the Internet may be traversed in this fashion. Thus, web pages that have been crawled (e.g., web pages that are deemed to include the particular topic on which the crawler is focused, such as, for example, movies) may be deemed to include movie references.

Figure 4B:
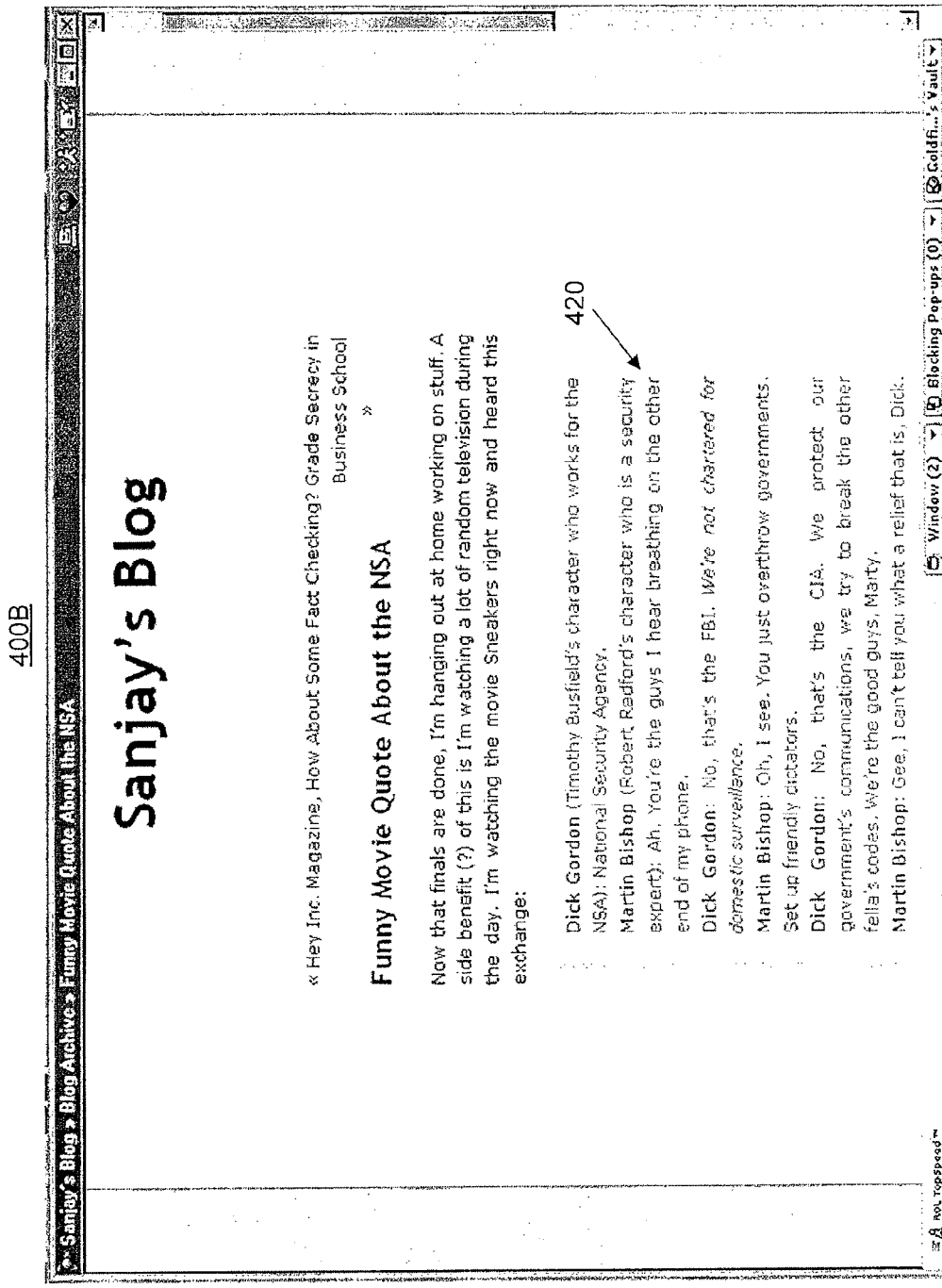

The search system 130 accesses a web page that has been identified as likely to include movie references (320). For example, the search system 130 may access one of web pages 400A or 400B of FIGS. 4A and 4B, respectively, which are both illustrations of web pages that include references to movies. More particularly, FIG. 4A is an illustration of a web page 400A for the American Film Institute (AFI) list of 100 years of movie quotes. The AFI web page 400A is related to movies as indicated by, for example, the word "film" in the web page title. Similarly, FIG. 4B is an illustration of a web page for Sanjay's Blog 400B. The Blog web page 400B is related to movies as indicated by, for example, inclusion of the word "movie."

The search system 130 detects a reference to a movie in the accessed web page (330). A movie reference may be any content, such as, for example, text, video or audio, in a web page, that is associated with a movie. For example, the movie quote "Frankly, my dear, I don't give a damn" from Gone with the Wind in the year 1939, as shown at 410 of FIG. 4A, may be detected, and the movie quote "You're the guys I hear breathing on the other end of my phone" from the movie Sneakers, as spoken by the character Martin Bishop played by Robert Redford, shown at 420 of FIG. 4B, also may be detected.

More particularly, a movie reference may include a discrete piece of information or a discrete idea related to a movie. The discrete piece of information or the discrete idea may include a movie-related word, and surrounding or related text. The surrounding or related text may be a phrase, a bullet point or sentence. For example, a web page that includes the statement "Its obvious why Gone with the Wind won the Best Picture Oscar in 1939" uses multiple movie-related words and phrases, such as a movie title (i.e., Gone with the Wind) and a movie award (i.e., Oscar and Best Picture), and, thus the movie-related word and surrounding words in the sentence may be deemed a movie reference.

If the document being examined for the presence of a movie reference is a multimedia document, such as, for example, audio or video, rather than a web page, a transcript of the document may be extracted using speech-to-text processing prior to determining whether the document includes a movie reference. Upon conversion to text, the document may be considered in the same manner as that described above for web pages. Alternatively, a transcript of, or metadata for, the multimedia document may be examined to determine if the document includes a movie reference. For example, the converted text for, or a transcript of, a home movie where a person makes the statement "Its obvious why Gone with the Wind won the Best Picture Oscar in 1939" may be a movie reference, as described above.

The search system 130 determines whether the detected movie reference includes at least one movie quote (341-343). The movie reference may be formatted as audio or video content or as a transcript. If the movie reference has an audio or video format, speech-to-text analysis may be used to convert the movie reference from audio/video to text, assuming this has not already been done to determine that the document (which includes the movie reference) is likely to include a movie reference. The text then may be analyzed to determine if the detected movie reference includes at least one movie quote. For example, if a web page includes video that, when converted to text, plainly includes the phrase "Nobody puts Baby in a corner," which is a movie reference that includes a movie quote, the movie reference in the web page may be deemed to include a movie quote.

The search system 130 may use one or more methods to identify text within a movie reference as a quote. By way of example, three such methods are described below.

First, the search system 130 may use text analysis to determine if a detected movie reference includes a quote (341). In text analysis, the search system 130 looks for quotation marks, or known parts of speech related to quotations, to determine whether the movie reference includes a quote. For example, the words "said" or "says" are known parts of speech related to quotations.

Second, the search system 130 may determine the movie to which the detected movie reference is related (e.g., based on a title or by accessing movie quote index 200) and use keywords from a transcript of the movie (as stored in the transcribed movie data store 142) to determine if the reference includes a quote (342). For example, the search system 130 may determine that a particular web page (e.g., a web page entitled "Mel Brooks, The Producer") is referencing a particular movie (e.g., the movie Spaceballs), and thus may search for quotes from that movie (e.g., the quote "What's the matter Colonel Sandurz? Chicken?" as accessed from a transcript of the movie) within the web page.

Third, the search system 130 may search for an identifiable set of key phrases, such as, for example [actor name] said/says "[text]", to deter mine if the reference includes a quote (343). Operation 343 may differ from operation 341 in that operation 341 may detect, for example, known parts of speech related to quotations, such as the word "said," without reference to an actor name, quotation marks or any other indication of a quotation, whereas operation 343 detects a particular set of key phrases (e.g., a group of quotation-related words and symbols) to identify a quote.

If the reference includes a quote, information related to the quote (e.g., movie title, actor name and character name) and included in the accessed web page is detected by the search system 130 (350). The search system may do so by using text analysis, as described above, to identify information related to the identified quote, such as, for example, movie title, actor name and/or character name using techniques that are similar to those described above with respect to identifying quotes.

The search system 130 stores the quote and the related information in movie quote index 200 of FIG. 2 (360). In some implementations, if the movie reference includes more than one quote, information related to each quote is detected by the search system 130 and is stored, separately, in the movie quote index 200. Alternatively, and in other implementations, search system 130 may detect, and subsequently store, only one quote per movie reference.

Figure 5:
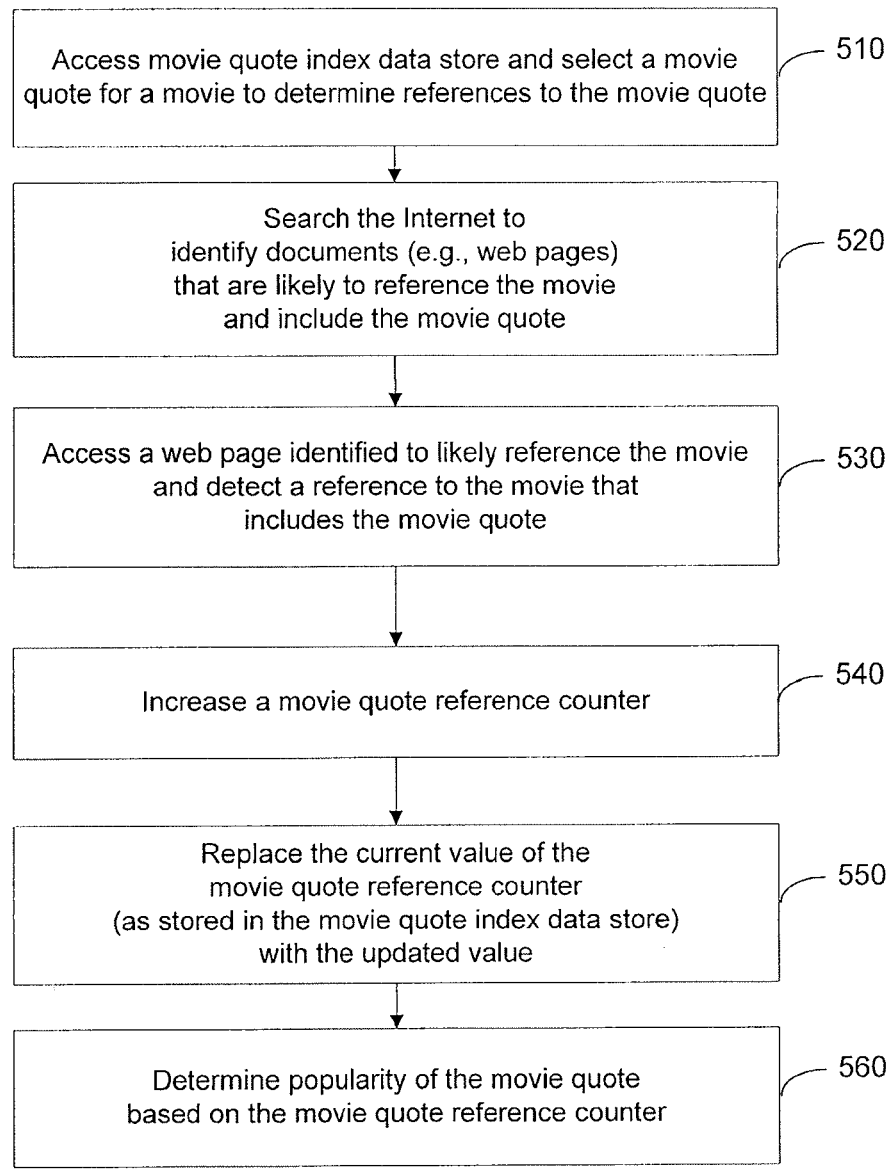
FIG. 5 is a flow chart of an exemplary process for determining popularity of a movie quote.

FIG. 5 is a flow chart of an exemplary process 500 for determining popularity information for a movie quote to be stored in association with the movie quote in a movie quote index, such as, for example, movie quote index 200 of FIG. 2. Generally, the operations of process 500 may be used in conjunction with the systems and configurations described earlier in FIG. 1B. For example, process 500 may be performed by the search system 130, and for convenience, the search system 130 is referenced as performing the process. However, similar methodologies may be applied in other implementations where different components are used to define the structure of the system, or where the functionality is distributed differently among the components shown. Movie video trailers for highly referenced (i.e., very popular) movie quotes may be created, stored and made accessible to users (e.g., in a list) as movie video trailers for popular movie quotes.

The search system 130 accesses the movie quote index data store 141 and selects a movie quote for a movie to determine references to the movie quote (510). For example, the search system 130 selects the quote "I'll be back" from movie quote index 200 of FIG. 2, which is stored in movie quote index data store 141.

The search system 130 searches the Internet for web pages that are likely to reference the movie and include the movie quote (520), as described in detail above.

The search system 130 accesses a web page that is likely to reference the movie and detects a reference to the particular movie that includes the movie quote (530). For example, the search system accesses an "All Arnold" web page that includes a statement that "I'm going on vacation next week, but I'll be back," which is a reference to the selected quote "I'll be back."

The search system 130 increases a movie quote reference counter to account for the reference to the movie quote in the accessed web page (540). The movie quote reference counter is stored in the movie quote index 200 in association with the movie quote, as shown in FIG. 2. The search system 130 replaces the current value of the movie quote reference counter with the updated value (550).

The popularity of the movie quote is determined by the search system 130 based on a value of the movie quote reference counter (560). A movie quote reference counter having a high value may indicate that a movie quote associated with the movie quote reference counter is very popular. This is the case because a high value of a movie quote reference counter may indicate a large number of references to the movie quote on the Internet, and thus may imply that many people are searching, or providing information, for, and hence interested in, the movie quote. In some implementations, a movie quote reference counter may be decreased upon detection by the search system 130 of a reference to a movie quote, and a lower value of a movie quote reference counter may be indicative of greater popularity.

In another implementation, a popularity of an entire movie may be determined and used to inform a measure of popularity for a particular quote within the movie. For example, whenever a reference to a movie is detected on the Internet, a movie reference counter may be increased (or decreased). Thus, the movie reference counter may indicate popularity of a particular movie. The popularity of a particular movie quote may be determined, at least in part, based on the overall popularity of the particular movie that includes the quote based on the movie reference counter associated with the movie. Moreover, the popularity of a particular movie quote may be determined based on a combination of a movie quote reference counter associated with the quote and a movie reference counter associated with the entire movie in which the quote appears. For example, the value of the movie reference counter and the value of the movie quote reference counters may be summed or otherwise arithmetically combined to determine a new value indicative of the popularity of a movie quote.

Recency of Internet content found to reference a movie or a particular movie quote may be accounted for, in some implementations, when computing popularity metrics. For example, older content (e.g., content that is not temporally recent) may be discounted relative to newer content (e.g., content that is closely (and temporally) related to a time at which the content is detected). Similarly, the number, frequency and rate of increase or decrease in user searches for a movie or a particular movie quote may be used as a mechanism to evaluate the popularity of the movie and/or the movie quote. For example, more recent reference and/or activity with respect to a movie or particular movie quote may be given more weight than less recent reference and/or activity with respect to the same movie or particular movie quote.

Additionally, or alternatively, without first accessing the movie quote index 200 as stored in movie quote index data store 141, the search system 130 may simply search the Internet for web pages and documents that reference movies. Each time a reference to a movie is detected, and determined to include a particular quote from the movie, the search system 130 may increase (or decrease) a temporary movie quote reference counter associated with the quote. When the temporary movie quote reference counter exceeds a threshold value, a movie video trailer for the quote may be created and stored in the movie video trailer data store 144. The movie video trailer then may be added to a list of movie video trailers for popular quotes that users can select and view. Additionally or alternatively, a combined popularity value, as described above, may be compared to the threshold value to determine whether to create and store a movie video trailer for the quote.

The transcribed movie data store 142 includes copies of, or references to, transcripts of movies, such as, for example, transcript 600, as illustrated by FIG. 6. The transcribed movie data store 142 may include full movie transcripts or transcripts that only include an excerpt from the movie. In some implementations, a transcript may be derived from speech-to-text processing of audio information (e.g., speech-to-text processing of audio associated with a movie), or, alternatively, a transcript may be manually created by a human editor. In some implementations, a single transcript may be created using both automated and manual processing.

More particularly, transcript 600 illustrates an excerpt of dialog from the movie The Wizard of Oz. The transcript 600 includes all of the lines spoken during the movie and an indication of which character is speaking each line. For example, in The Wizard of Oz, the character Dorothy says "Toto, I've a feeling we're not in Kansas anymore," as shown at 610. In some implementations, a transcript, such as, for example, transcript 600, may be timestamped to enable easy detection of particular scenes. For example, the location of a particular quote within a movie may be determined, and associated with a timestamp for that location. As such, the location of the quote may be subsequently retrieved from within the transcript or full video of the movie based on the associated timestamp.

The full movie video data store 143 represents various locations at which video files that include full video of movies are stored. In some implementations, the full movie video data store 143 may actually include copies of some, or all, full movies accessible to a user. For example, the full movie video data store 143 may store full movies purchased by the user on the Internet, and delivered via download, or uploaded by the user from a copy of a DVD or VHS tape owned by the user. Alternatively, or additionally, the full movie video data store 143 may include references to video files that include full movies, rather than storing copies of the full video files. For example, the full movie video data store 143 may include references to full video files stored at a remote server across a public or private network, or stored locally on a user's computer system (e.g., an internal or external hard drive) or other storage device (e.g., disk, flash drive, CD-ROM, DVD or other media). In such an implementation, a request for a full movie received by the full movie video data store 143 may be interpreted as a request for the full movie video data store 143 to access a video file for the full movie based on the reference thereto.

The movie video trailer data store 144 may include previously generated movie video trailers for scenes that include movie quotes. In some implementations, movie video trailers generated, as described below, may be stored in the movie video trailer data store 144 in order to avoid a need for re-creation of a previously generated movie video trailer when a user requests a scene for a movie quote included in the previously generated movie video trailer. As such, upon receipt of a movie video trailer request for a particular quote, the search system 130 may access the movie video trailer data store 144 to determine if a movie video trailer that includes a scene associated with the quote has already been created and stored. Additionally, movie video trailers may be stored in the movie video trailer data store 144 in order to provide the movie video trailers to users as a list of pre-generated movie video trailers from which a user may select a movie video trailer to view. In some implementations, a movie video trailer and/or scene for a particular quote may only be stored in the movie video trailer data store 144 if the particular quote is highly referenced on the Internet.

The system of FIG. 1B also may be used to create trailers for quotes from television shows, political speeches, sports events, commercials, home movies and other video or audio content. For example, in the case of a television show trailer, the search system 130 may be configured to access a television quote index data store, a transcribed television episode data store, a full video television episode data store and a television trailer data store. For example, a television quote index may differ from the movie quote index 200 in that the television quote index may include, for example, information related to a television show title, an episode title, a channel on which the show airs, a day on, and a time at, which the show airs and an indication of whether the actor who played the character who spoke the quote is a permanent character on the show or a guest star.

Figure 7:
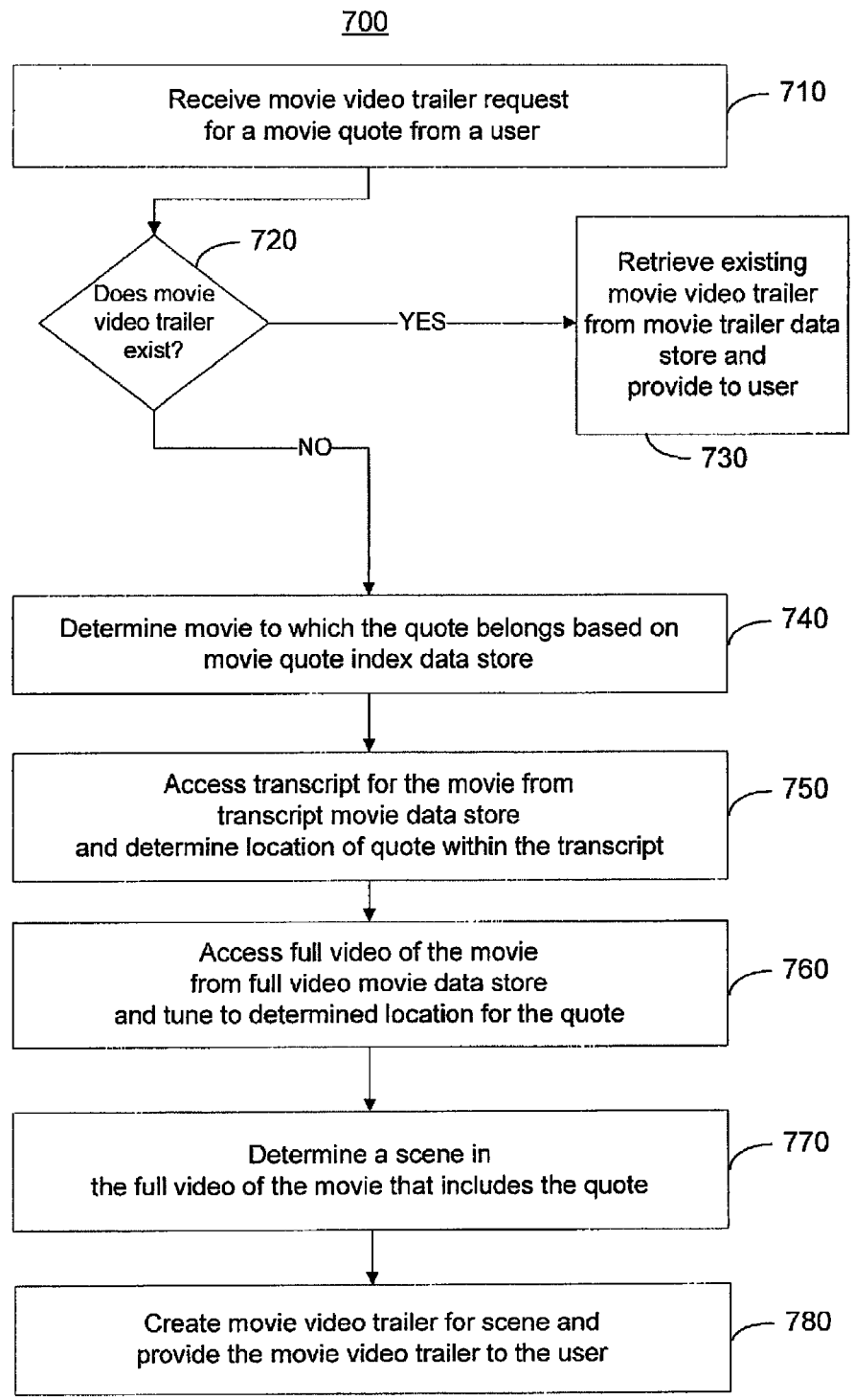
FIG. 7 is a flow chart of an exemplary process for providing a movie video trailer to a user.

FIG. 7 is a flow chart of an exemplary process 700 for providing a movie video trailer to a user using the information described as being identified and generated by the search system 130 above. Generally, the operations of process 700 may be used in conjunction with the systems and configurations described earlier in FIG. 1B. For example, process 700 may be performed by the search system 130, and for convenience, the search system 130 is referenced as performing the process. However, similar methodologies may be applied in other implementations where different components are used to define the structure of the system, or where the functionality is distributed differently among the components shown.

The search system 130 receives a movie video trailer request for a movie quote (710). The request may be, for example, a selection by a user of a movie video trailer from a list or grouping of existing movie video trailers. In another example, the request may be a search query provided by a user for a trailer that represents a particular movie quote.

The search system 130 determines whether the movie video trailer requested by the user already exists (720). To make the determination, the search system 130 accesses the movie video trailer data store 144 to determine if a movie video trailer for the particular quote has already been created and stored therein by, for example, identifying a movie video trailer having a title or metadata associated with the requested movie quote. In some implementations, movie video trailers selected by a user from a list or grouping of pre-created movie video trailers may include an indication that the movie video trailer exists, which the search system 130 may receive with the request.

If the requested movie video trailer exists, the search system 130 retrieves the movie video trailer from the movie video trailer data store 144 and provides the movie video trailer to the client 110 through the network 120 for presentation to the user (730).

If the requested movie video trailer does not exist, the search system 130 creates the movie video trailer on the fly. To do so, the search system 130 determines a movie to which the movie quote belongs based on information in the movie quote index 200 as stored in the movie quote index data store 141 (740). More particularly, the search system 130 may search for the quote (or some portion thereof) within a movie quote index (e.g., movie quote index 200 of FIG. 2), and, once the movie quote is found, the search system 130 may identify a movie associated with the movie quote.

The search system 130 accesses a transcript for the determined movie from the transcribed movie data store 142 and determines a location of the movie quote within the accessed transcript (750). If the transcribed movie data store 142 does not include a transcript for the movie, the search system 130 may create one on-the-fly using the techniques described above.

The location of the quote within the transcript may be determined by performing a text search of the transcript for all, or a portion of, the quote. The location of a quote may include, for example, a page and line number within the text transcript, in addition to a location within the full video based on a timestamp (or other reference, such as, for example, a counter) associated with the location of the quote within the transcript. In some implementations, a transcript may not include timestamps or counters for every single quote within a movie, and as such, the location of a non-timestamped quote within the full video of a movie may be approximated based on locations of surrounding words and phrases that are associated with timestamps. If a transcript does not include any timestamps or counters associated with words and phrases from within the movie, the location of a particular quote may be determined based on, for example, surrounding scene information (e.g., beginning or end of scenes marked by timestamps) or speech-to-text processing configured to locate a quote within the full video of a movie.

The search system 130 accesses full video of the movie from the full video movie data store 143 and tunes to the determined location for the quote (760). For example, the timestamp associated with the quote, and determined in operation 350, may be used to tune to the quote within the full video of the movie. If a precise location for a quote (e.g., timestamp or other reference) is not available, as described above, an alternate method, such as, for example, surrounding word or phrase timestamps, surrounding scene information or speech-to-text processing, may be used to tune the full video of the movie to an approximate location of the quote.

The search system determines a scene in the full video of the movie that includes the quote (770). A scene that includes the quote (e.g., action and content that is occurring in the movie when the quote is spoken) may be determined by moving backwards and forwards around the exact moment in the movie when the quote is spoken, as described in more detail below.

The search system 130 creates a movie video trailer for a scene from the full video of the movie that includes the quote and provides the movie video trailer to the client 110 through the network 120 for presentation to the user (780). To create the movie video trailer, the search system 130 may, in some implementations, crop the full video of the movie to include the scene for the quote, and none, or some small portion, of the rest of the movie. Alternatively, the search system 130 may provide a reference or pointer to the scene that includes the quote so that the scene may be perceivable to a user without requiring the user to view the entire full movie and without cropping the video.

Figure 8:
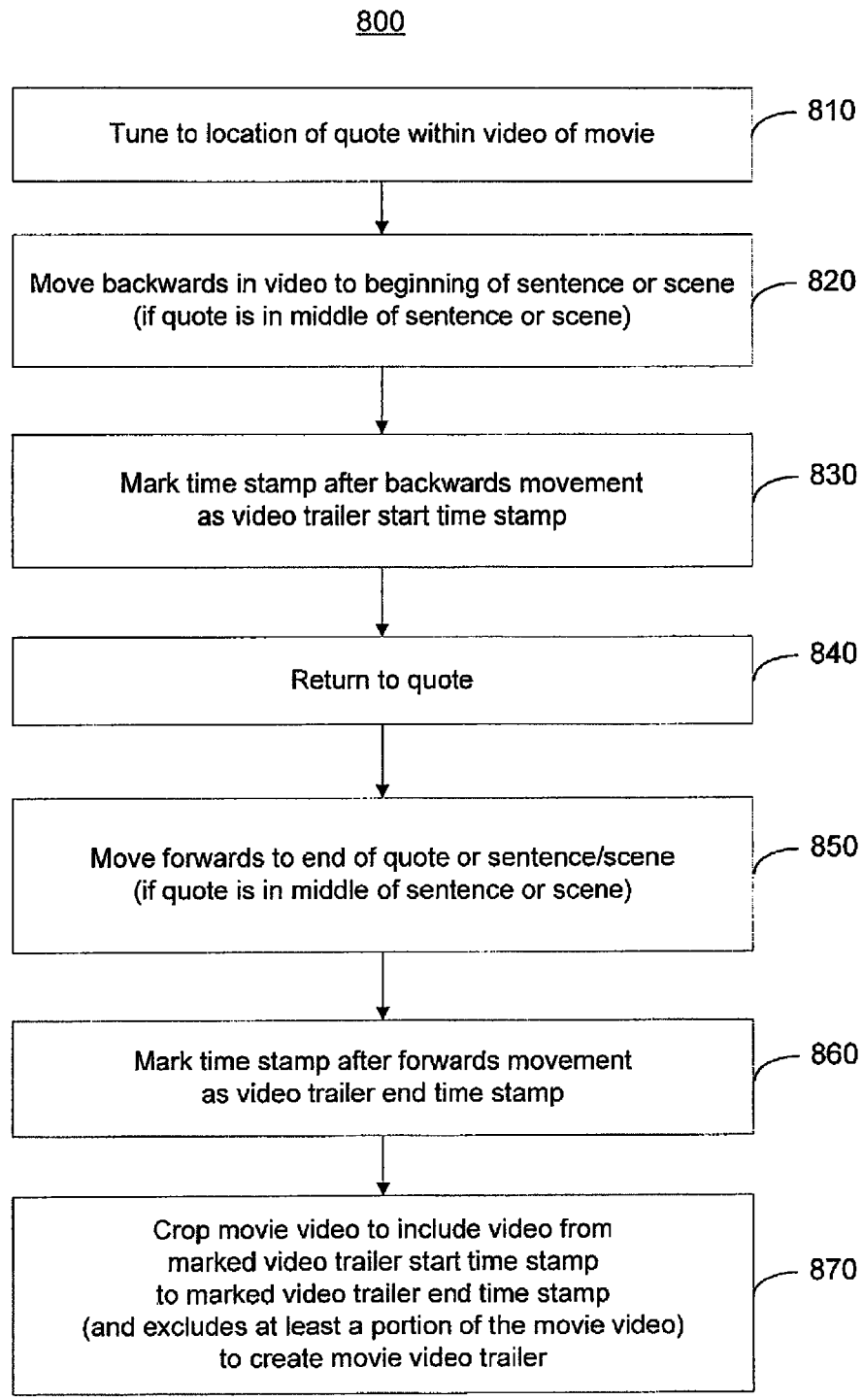
FIG. 8 is a flow chart of an exemplary process for creating a movie video trailer for a particular movie quote from a scene that includes the movie quote.

FIG. 8 is a flow chart of an exemplary process 800 for creating a movie video trailer for a particular movie quote from a scene that includes the movie quote. Generally, the operations of process 800 may be used in conjunction with the systems and configurations described earlier in FIG. 1B. For example, process 800 may be performed by the search system 130, and for convenience, the search system 130 is referenced as performing the process. However, similar methodologies may be applied in other implementations where different components are used to define the structure of the system, or where the functionality is distributed differently among the components shown. Process 800 is an example of a particular implementation of operation 770 of FIG. 7.

The search system 130 tunes to a location of a particular quote within the full video of a movie (810). The search system 130 moves backwards (e.g., rewinds) from the location of the quote in the video to a predetermined point (820). The rewinding from the location of the quote may be to a predetermined point at the beginning of a scene in which the quote resides or to the beginning of a sentence if the quote is in the middle of a sentence. For example, the quote "Nobody puts Baby in a corner" from the movie Dirty Dancing takes place in the middle of a scene of the movie in which the character Baby and her family are watching entertainment being performed on a stage. In some implementations, the search system 130 may rewind the movie from the beginning of the quote to the beginning of that scene. The beginning of a scene may be determined based on an indication of "Begin Scene" or a similar indication in the movie transcript, a scene start time stamp embedded within the full video of the movie or by an indication identified by a human editor.

In another example, the quote "I don't give a damn" from the movie Gone with the Wind is actually part of a larger sentence in which the character Rhett Butler says "Frankly, my dear, I don't give a damn." If a trailer is to be created for the sub-sentence quote "I don't give a damn," in some implementations, the search system 130 may rewind the movie from the beginning of the quote (e.g., "I") to the beginning of the sentence (e.g., "Frankly").

It also may be possible to rewind an additional amount of time within the video, which amount is not directed to a particular point. For instance, it may be desirable to rewind an amount of time that is predetermined or, in some implementations, varied depending on the particular movie, the type of movie or other considerations. In a more particular example, an additional five seconds may be added to ensure the true beginning of the scene is not cut off during creation of the trailer. Upon reaching the farthest point backwards from the quote that the search system 130 seeks, the search system 130 marks the time stamp at that point of the movie as the movie video trailer start time stamp (830) and returns to the location of the quote (840).

Similar to operation 820, the search system 130 moves forward (e.g., fast forwards) from the location of the quote to the end of the present scene or sentence, and/or potentially an additional amount of time (850). Similar to operation 830, the search system 130 marks the time stamp of the end point of the scene or sentence (plus the additional amount of time, if added) as the movie video trailer end time stamp (860).

The search system 130 crops the full movie video to include video from the marked movie video trailer start time stamp to the marked movie video trailer end time stamp (870) and exclude all, or some, of the video content not included between the two time stamps. In some implementations, cropping a full movie video may include removing some or all video content that is outside the bounds of the movie video trailer start time stamp and the movie video trailer end time stamp. In other implementations, cropping the full movie video may include storing the video content between the movie video trailer start and end time stamps, as well as some other portions of the full movie video, so long as at least a portion of the full movie video is excluded from the cropped video.

In some implementations, the beginning and/or end of a cropped video may be refined to ensure that the video does not begin and/or end abruptly or in the middle of, for example, a word, sentence, action or scene. Such refinement may be performed through the use of video processing techniques. For example, features indicative of a scene change (e.g., speech cessation or initiation, change in voice of a particular character, scenery change and/or change of characters shown) may be detected at the beginning and end of a cropped video. If no indication of a scene change is identified, the search system 130 may expand the beginning and/or end of the cropped video by, for example, adding more content from the full video to the beginning and/or end of the cropped video, to ensure that the beginning and end are refined.

The cropped (and refined) video is the movie quote trailer.

In some implementations, a video that includes a movie may be pre-processed by the search system 130, or some other component, to identify, and label, segments that include a movie quote. One or more timestamps (e.g., timestamps associated with a start time and an end time or a timestamp associated with a start time plus a segment duration) associated with the scene that includes the movie quote may be stored, in association with the quote, for later retrieval. Upon receiving a request for a movie video trailer that includes the quote, the search system 130 may access the timestamp(s) associated with the quote and create a movie video trailer for the quote on-the-fly based on the stored timestamp(s).

Figure 9:
FIG. 9 is an illustration of a user interface (UI) that includes a movie video trailer created for a particular movie quote.

FIG. 9 is an illustration of a user interface (UI) that includes a movie video trailer 900 created for a particular movie quote. More particularly, FIG. 9 shows a result of process 800 of FIG. 8 in the form of a movie video trailer 900 for a quote from the movie E.T. The Extraterrestrial. The quote 910, as shown on the right side of the window, is "E.T. phone home." The movie video trailer 900 includes the entire scene in which E.T. speaks the quote. For example, the scene includes a certain amount of action and dialog, before and after the quote is spoken.

Figure 10:
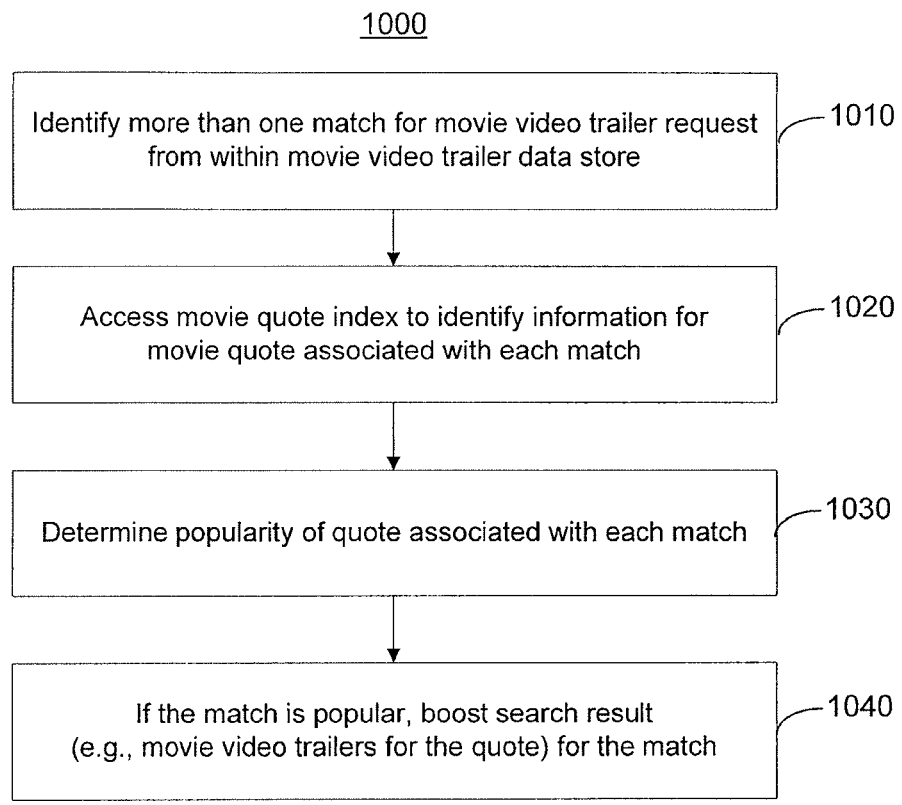
FIG. 10 is a flow chart of an exemplary process for providing movie video trailer results to a user based on popularity of movie quotes associated with each result.

FIG. 10 is a flow chart of an exemplary process 1000 for providing movie video trailer results to a user based on popularity of movie quotes associated with each result. Generally, the operations of process 1000 may be used in conjunction with the systems and configurations described earlier in FIG.

1B. For example, process 1000 may be performed by the search system 130, and for convenience, the search system 130 is referenced as performing the process. However, similar methodologies may be applied in other implementations where different components are used to define the structure of the system, or where the functionality is distributed differently among the components shown.

The search system 130 identifies more than one match for a movie video trailer request from within the movie trailer data store 144 (1010). For example, search system 130 may receive a movie video trailer request (e.g., a video search query) that includes at least a portion of a movie quote, such as, for example, "offer he can't refuse." The search system 130 identifies more than one match for the request in the movie video trailer data store 144. A match may be a quote that includes all, or some, of the words in the video search query. For example, a match for the video search query "offer he can't refuse" may be a movie quote from The Godfather that, in full, is "I'm going to make him an offer he can't refuse." However, the Mel Brooks movie Robin Hood: Men in Tights includes the quote "We'll make him an offer he can't refuse," as spoken by Dom DeLuise's character Don Giovanni, which also includes the search query text "offer he can't refuse," and thus, the Robin Hood quote is also a match for the video search query.

The matches may include, in the present example, the quote "I'm going to make him an offer he can't refuse," and the quote "We'll make him an offer he can't refuse." The search system 130 may access a movie quote index, such as, for example, movie quote index 200 of FIG. 2, to identify information related to the movie quote associated with each match (1020).

The search system 130 determines popularity of the quote associated with each match (1030). The popularity of a quote may be determined based on a movie quote reference counter associated with the quote, and stored in movie quote index 200 of FIG. 2. For example, The Godfather quote is likely more popular than the Robin Hood quote (particularly since the scene in which the Robin Hood quote appears is a spoof of the original Godfather scene), and thus, for example, the value of a movie quote reference counter associated with The Godfather quote may be greater than that of a movie quote reference counter associated with the Robin Hood quote.

If the match is deemed popular (e.g., the match has a popularity rating above a threshold number), the search system 130 boosts the search result that corresponds to the movie video trailer for the popular quote (1240). In some implementations, a search result may be boosted by associating a ranking with the search result that is higher than it may have been under other circumstances. For example, search results may be ranked by a default ranking mechanism that takes into account how recent content associated with the search result has been updated, the type of content (e.g., audio, video or text) that is being referenced by the search result or information stored in a user profile associated with a user who provided the search query. In other implementations, a search result that is to be boosted may simply be relocated to the top of a search result list.

In some implementations, rather than boosting search results associated with more popular movie quotes, those search results may be presented in a move visually prominent way than search results associated with less popular movie quotes. For example, the popular search results may appear under a heading that indicates "We Think You Were Referring To This Movie Video Trailer" or "Movie Video Trailers for Popular Movie Quotes." In another example, such a search result may include an indication that the movie quote to which it corresponds is popular such as a red "popularity" star appearing next to the search result, or special font (e.g., bold or italics), indentation (e.g., block indentation) or coloring (e.g., red, while other search results are provided in black) of the search result.

In some implementations, a search result having a high popularity (e.g., a search result that would be boosted based on its popularity) may be automatically selected for a user as a match for the user's movie video trailer request. As such, a movie video trailer corresponding to the search result may be provided to the user in such a format that the movie video trailer is substantially immediately available for perception by the user, such as, for example, by launching a video application on a computer associated with the user and starting display of the movie video trailer. In addition, the user may be provided with search results for other (less popular) movie video trailers, such that in the case that the presented movie video trailer is not responsive to the user's request (e.g., the user was seeking a different movie video trailer), the user may select an alternative movie video trailer without having to re-execute the user's search.

If a trailer for a quote that matches the video search query has been previously created (e.g., a trailer for The Godfather quote), then a match may exist in the movie video trailer data store 144. If a quote that matches the video search query exists in the movie quote index data store 141, but no trailer has been created for the quote (e.g., the Robin Hood quote), a trailer may be created on the fly in response to the search request.

As described previously, in some implementations, a movie video trailer may be created for a particular politician's stance, such as, for example Governor Tim Kaine of Virginia, on a particular political issue, such as, for example, transportation spending, or for the positions of multiple politicians (e.g., all politicians running in a particular race) on a particular political issue.

Figure 11:
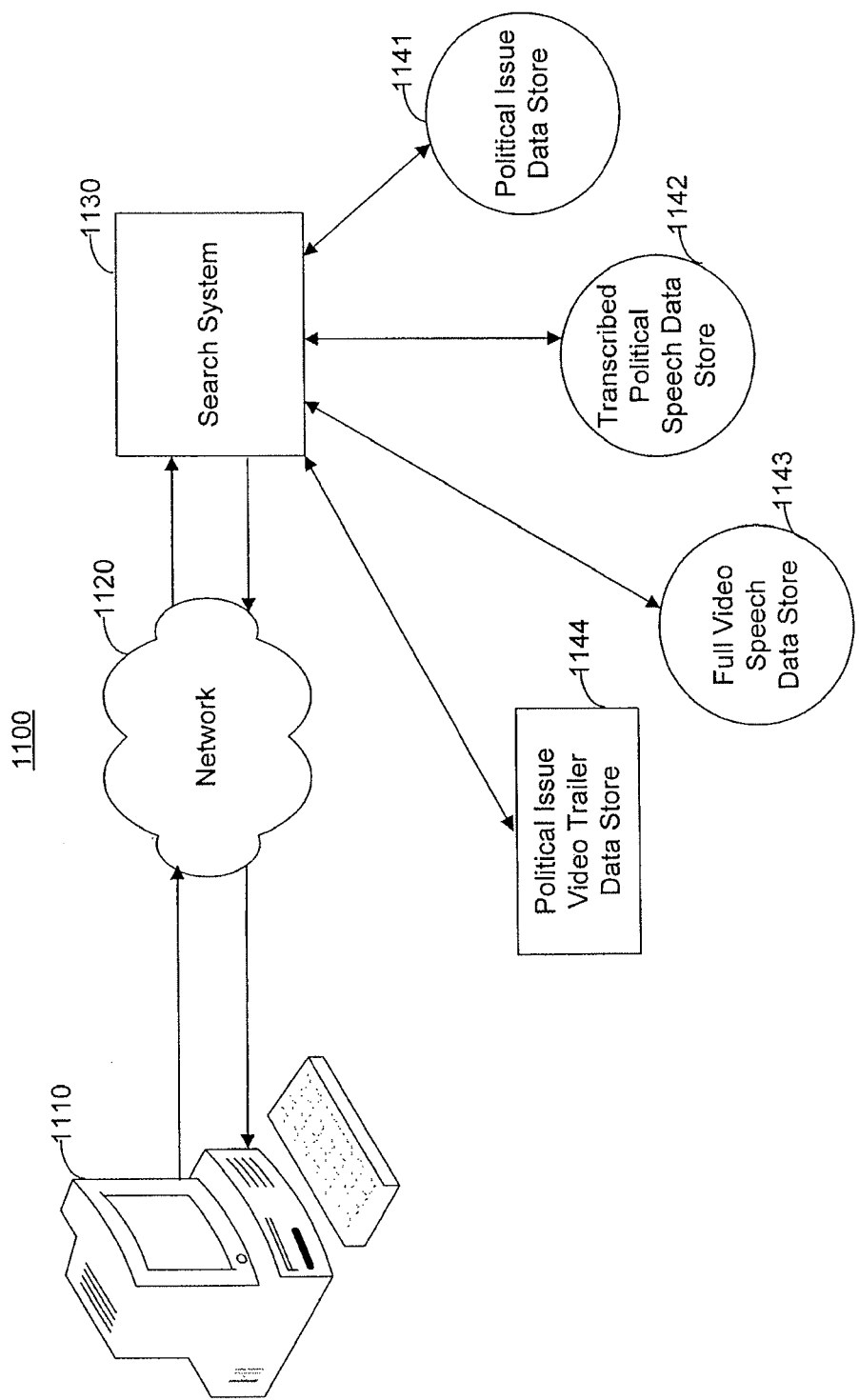

FIG. 11 is a block diagram of an exemplary communications system 1100 that includes a client 1110 connected to a search system 1130 through a network 1120. The client 1110 may be configured to enable a user to perceive a political issue video trailer for a political issue in response to the user requesting creation of a political issue video trailer for a particular political issue or in response to the user selecting a previously created political issue political issue video trailer. The client 1110 may receive the political issue video trailer from the search system 1130 through the network 1120.

The client 1110, the network 1120 and the search system 1130 may be configured and implemented similar to the client 110, network 120 and search system 110, of communications system 100B of FIG. 1B, as described in detail above.

However, in contrast to the communications system 100B of FIG. 1B, the components of communications system 1100 may be configured to identify and/or generate a political issue video trailer to be presented to a user in response to a request for such a political issue video trailer. More particularly, the search system 1130 may be configured to supply a political issue video trailer to the client 1110, through the network 1120, based on access by the search system 1130 to a political issue data store 1141, a transcribed political speech data store 1142, a full video speech data store 1143 and a political issue video trailer data store 1144.

Figure 12:
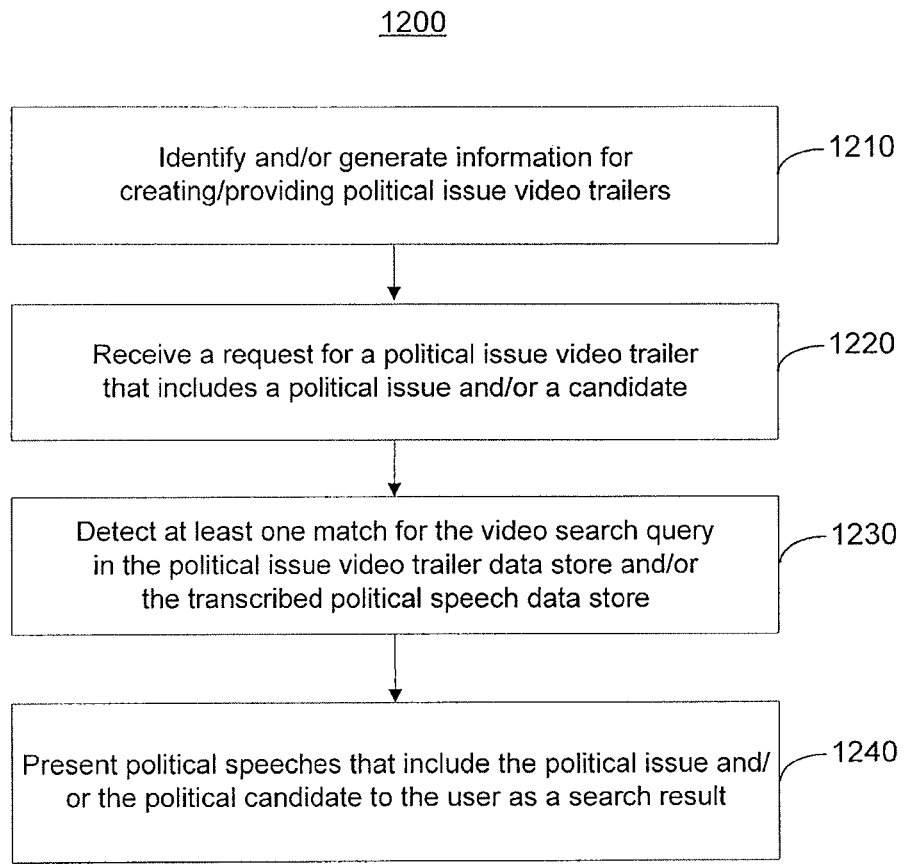
FIG. 12 is a flow chart of an exemplary process for providing a political issue video trailer that includes a particular political issue and/or candidate to a user.

FIG. 12 is a flow chart of an exemplary process 1200 for providing a political video trailer that includes a particular political issue and/or candidate to a user. Generally, the operations of process 1200 may be used in conjunction with the systems and configurations described earlier in FIG. 11. For example, process 1200 may be performed by the search system 1130, and for convenience, the search system 1130 is referenced as performing the process. However, similar methodologies may be applied in other implementations where different components are used to define the structure of the system, or where the functionality is distributed differently among the components shown.

The search system 1130 identifies and/or generates information to be used by the search system 130 for creating and/or providing political issue video trailers to a user (1210). For example, the search system 1130 may identify a list of political issues and political candidates or politicians. In addition, the search system 1130 also may identify full political speeches that include a particular political issue and/or political candidate or politician (e.g., by searching or crawling the Internet). Moreover, the search system 1130 may identify and/or generate portions of full political speeches that include discussion of a particular political issue by a particular political candidate or politician.

The search system 1130 receives a request for a political issue video trailer that includes a political issue and/or a political candidate from a user (1220). In some implementations, a user may request a political issue video trailer for one or more politicians' stands on a particular political issue by selecting one from a list of existing political issue video trailers. For example, a user may select a pre-existing political issue video trailer that relates to candidate Tim Kaine's position on tax reform.

Additionally, a user may request a political issue video trailer by providing a search query for a political issue video trailer that represents the position of one or more politicians on a particular political issue. In some implementations, a user may provide a structured query that includes a candidate name (or part thereof) and a particular issue (or a keyword associated with an issue). For example, a user may supply the query "Kaine+tax." Additionally, or alternatively, the user may provide information related to a political issue video trailer sought by the user using one or more graphical user interface elements (e.g., a drop-down menu, checkboxes, radio buttons, text entry boxes or some combination thereof). For example, the user may select a checkbox for candidate Tim Kaine and another checkbox for the issue "taxes."

The search system 1130 detects at least one match for the video search query in the political issue video trailer data store (1230). The search system 1130 accesses the political issue video trailer data store 1144 to determine if a political issue video trailer that is a match for the request has already been created. If so, the search system 1130 provides the political issue video trailer to the client 1110 through the network 1120 for presentation to the user.

If not, the search system 1130 may create the political issue video trailer on the fly, as described in detail below. In some implementations, a scene created on the fly may be stored in the political issue video trailer data store 1144 for future use. In some implementations, the scene may only be stored if the particular politician's stance on the political issue is highly referenced on the Internet.

The search system 1130 presents political speech video trailers that include the political issue and/or the political candidate to the client 1130 through the network 1120 for presentation to the user (1240).

Figure 13:
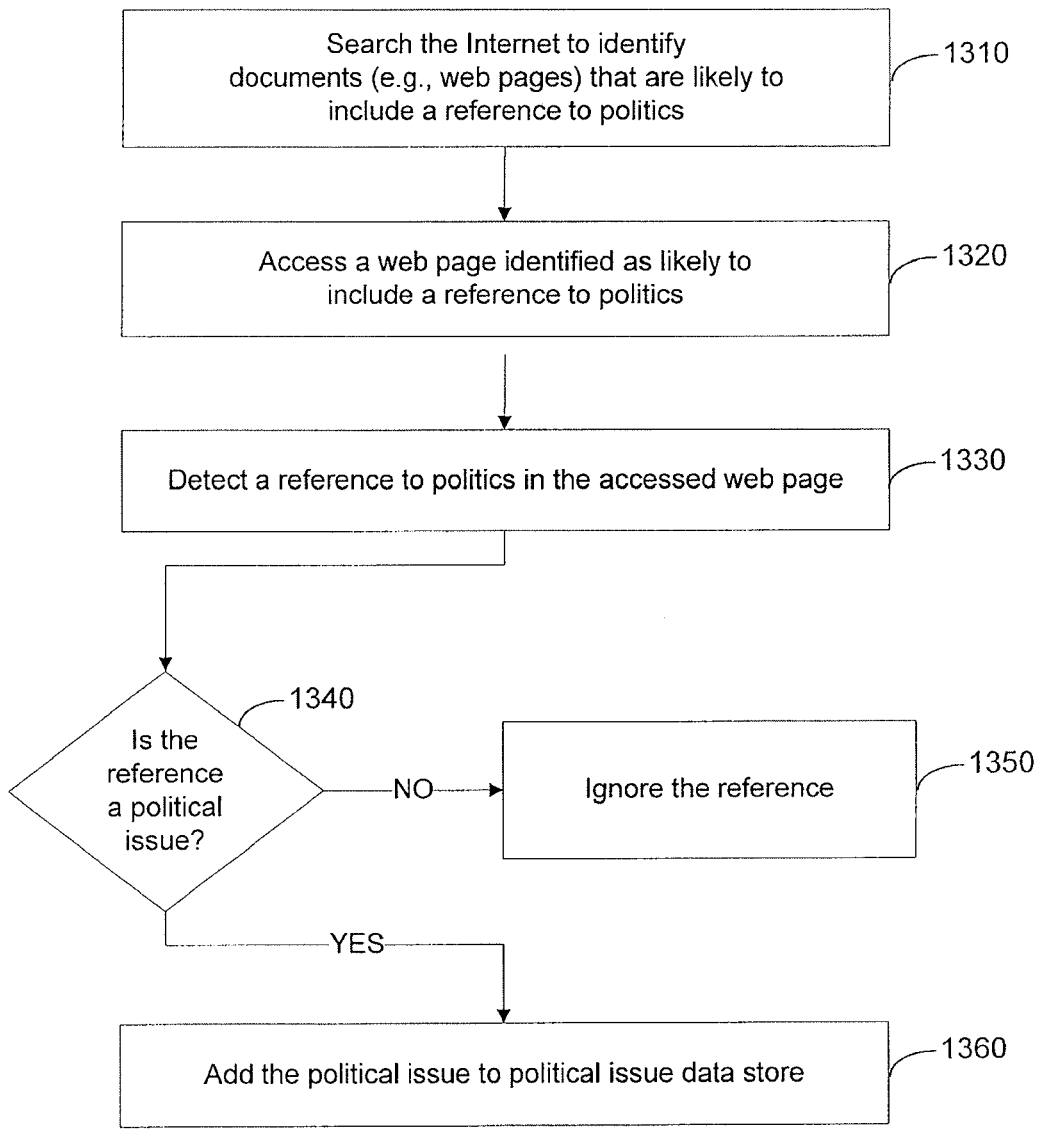
FIG. 13 is a flow chart of an exemplary process for identifying political issues.

FIG. 13 is a flow chart of an exemplary process 1300 for identifying political issues. Generally, the operations of process 1300 may be used in conjunction with the systems and configurations described earlier in FIG. 11. For example, process 1300 may be performed by the search system 1130, and for convenience, the search system 1130 is referenced as performing the process. However, similar methodologies may be applied in other implementations where different components are used to define the structure of the system, or where the functionality is distributed differently among the components shown. More particularly, process 1300

The search system 1130 searches the Internet to identify web pages that are likely to include a reference to politics (1310). The search system 1130 may be seeded with information on how to detect whether a web page may be related to politics or may include a reference to politics. The seeding information may include political terms (e.g., "candidate," "primary," "campaign" or a party name) and may be provided by a human editor. For example, a web page having a uniform resource locator (URL) of "campaignheadquarters.org," which includes the words "campaign" and "headquarters," or a web page title that includes the phrase "Campaign Headquarters" may be determined to be likely to reference politics. The list may automatically be updated based on the searching the Internet performed during process 1400.

The search system 1130 accesses a web page that has been identified as likely to include a reference to politics (1320) and detects a reference to politics in the accessed web page (1330). A reference to politics may be any content (e.g., text, audio or video) that relates to a political issue, a political office, a political candidate, a debate, a campaign or a particular race. For example, a reference in a web page that indicates that "President supports local candidates" is a reference to politics.

Similar to a movie reference, as described above, a reference to politics may include a discrete piece of information or a discrete idea related to politics. The discrete piece of information or the discrete idea may include a political term (e.g., campaign), and surrounding, or related text. The surrounding or related text may be a phrase, a bullet point or sentence. For example, a web page that includes the statement "Tim Kaine, the Democratic party candidate, ran a great campaign" uses multiple political terms and phrases, such as a politician's name (i.e., Tim Kaine), a party name (i.e., Democrat) and political terms (i.e., "campaign" and "candidate"), and, thus the movie-related word and surrounding words in the sentence may be a reference to politics.

If the document being examined for the presence of a reference to politics is a multimedia document, such as, for example, audio or video, rather than a web page, a transcript may be extracted from the document using speech-to-text processing prior to determining whether the document includes a reference to politics. Upon conversion to text, the document may be considered in the same manner as that described above for web pages. Alternatively, a transcript of the multimedia document may be examined to determine if the document includes a reference to politics. For example, the converted text for, or a transcript of a home movie where a person makes the statement "Tim Kaine, the Democratic party candidate, ran a great campaign" may be a reference to politics, as described above.

Upon detection of a reference to politics, the search system 1130 determines whether the reference includes a political issue (1340). If not, the search system 1130 ignores the reference (1350). If the reference includes a political issue, the search system 1130 adds the political issue to the political issue data store 1141 (1360). Examples of political issues include taxes, education and health care legislation. In some implementations, if a reference to politics includes more than one political issue, the search system 1130 may detect and store each of the political issues present in the reference. Alternatively, and in some implementations, search system 1130 may only detect one political issue per reference, despite the number of political issues that actually appear in the reference.

Figure 14:
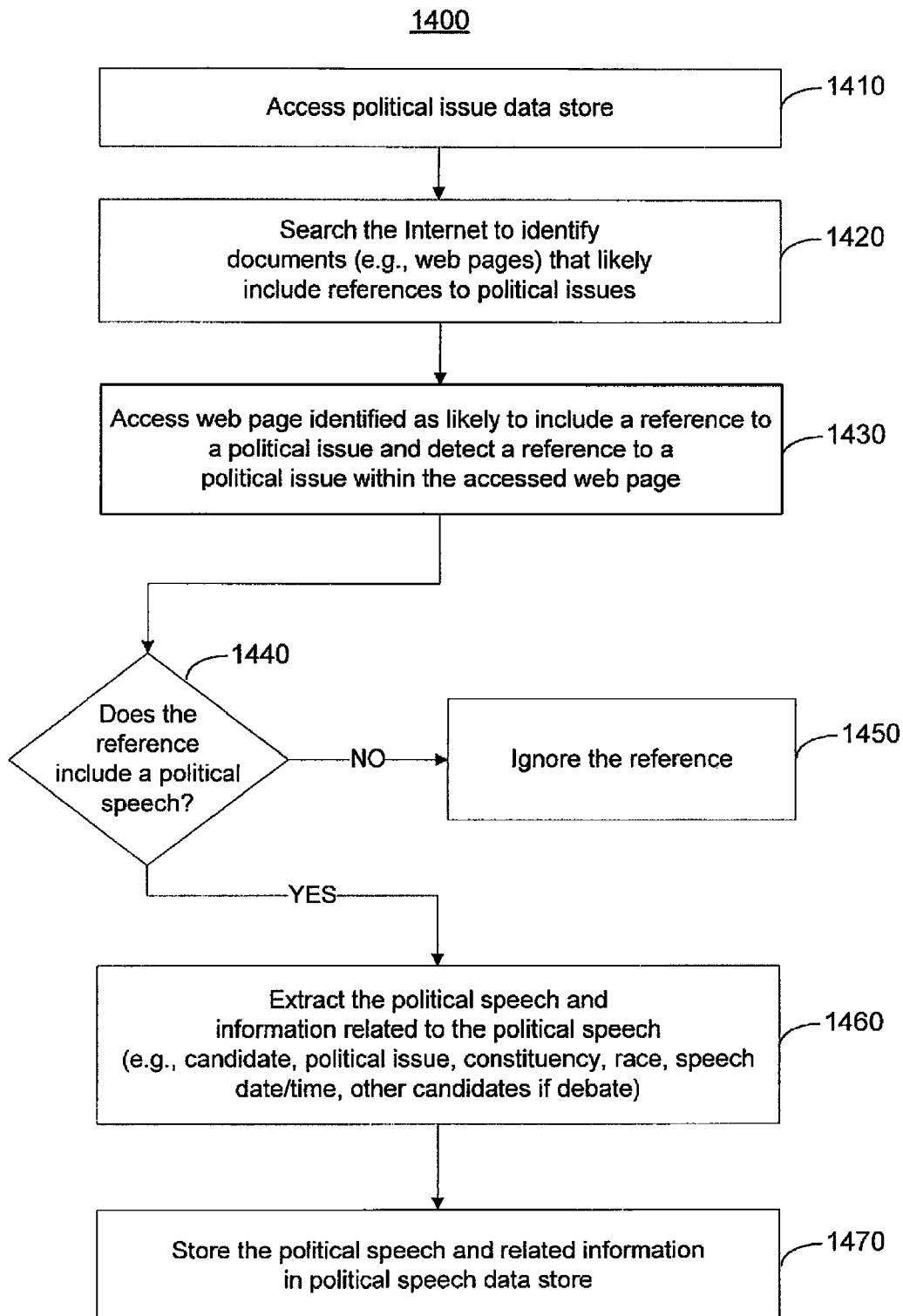
FIG. 14 is a flow chart of an exemplary process for identifying political speeches that relate to a particular political issue.

FIG. 14 is a flow chart of an exemplary process 1400 for identifying political speeches that relate to a particular political issue. Generally, the operations of process 1400 may be used in conjunction with the systems and configurations described earlier in FIG. 11. For example, process 1400 may be performed by the search system 1130, and for convenience, the search system 1130 is referenced as performing the process. However, similar methodologies may be applied in other implementations where different components are used to define the structure of the system, or where the functionality is distributed differently among the components shown.

The search system 1130 accesses the political issue data store 1141 (1410). The political issue data store 1141 may include political issues that were detected and stored during process 1400. The search system 1130 searches the Internet to identify web pages that likely include references to at least one of the political issues in the political issue data store 1141 (1420). The search system 1130 accesses a web page that has been identified as likely to include a reference to a political issue and detects a reference to a political issue within the accessed web page (1430).

Upon detecting a reference to a particular political issue, the search system 1130 determines whether the reference includes a political speech (1440). The search system 1130 may be seeded with information related to detecting whether a reference to politics is a reference to a political speech. For example, the search system 1130 may look for words related to political speeches, such as the name of a candidate and the words "said," "argued," or "countered," or the words and phrases, "debate," "address," "constituents," "speaks out," etc.

If the reference is not a political speech, the reference is ignored (1450). If the reference is a political speech, the search system 1130 extracts the political speech and any information related to the political speech (1460). The political speech may be in the form of audio or video content or a transcript. If the speech is in an audio or video format, speech-to-text analysis may be used to convert the speech from audio to text. The information related to the political speech may include, for example, the candidate who gave the speech, the particular political issue(s) to which the speech is related, the constituency of the person who gave the speech, the political race during which the speech was given, the date and/or time of the speech, and any other candidates included in the speech, if, for example, the speech is a debate. The search system 1130 stores a transcript of the political speech in the transcribed political speech data store 1142 (1470). In some implementations, the search system 1130 also may store video or audio of the speech in the full video speech data store 1143. A reference to the speech may be stored in the political issue data store 1141 in association with the political issue, or issues, to which the speech pertains.

FIG. 15 is a flow chart of an exemplary process 1500 for creating a political issue video trailer for a particular political candidate's stance on a particular political issue. Generally, the operations of process 1500 may be used in conjunction with the systems and configurations described earlier in FIG. 11. For example, process 1500 may be performed by the search system 1130, and for convenience, the search system 1130 is referenced as performing the process. However, similar methodologies may be applied in other implementations where different components are used to define the structure of the system, or where the functionality is distributed differently among the components shown.

The search system 1130 accesses the political issue data store 1141 and selects a political issue (1510). The political issues in the political issue data store 1141 may have been detected and stored during processes 1300 and 1400, respectively.

The search system 1130 accesses the transcribed political speech data store 1142 and selects a political speech that includes the political issue as referenced with the issue in the political issue data store 1141 (1520). The political speeches in the transcribed political speech data store 1142 may have been detected and stored during process 1400 of FIG. 14. The candidate who gave the selected speech may be determined from the information related to the political speech as also stored in the political issue data store 1141.

The location of the political issue within the transcribed political speech is determined for each candidate (e.g., if the speech is a debate between three candidates, there may be three locations where the political issue is discussed; that is, a separate location for each candidate) (1530). The location of the political issue within the speech transcript may be determined based on the position of keywords related to the political issue in the transcript and one or more timestamps associated with the transcript-based locations of the keywords. For example, if the political issue is taxes, keywords that may indicate the location of a portion of a speech where a candidate discusses the political issue may include "taxes," "raise," "IRS," "lower," "audit," "bracket" or "money."

The search system 1130 retrieves video of the political speech from the full video speech data store 1143 (1540). The location of the discussion of the political issue (for each candidate) is determined based on the timestamps determined in operation 1530 based on the location of the discussion within the transcribed political speech (1550).

The search system 1130 moves forwards and backwards within the video of the speech, from the location of the discussion of the political issue, to determine and mark a scene that only includes the discussion of the political issue (1560), as described in detail above with respect to determining a scene that includes a movie quote. A scene may be a portion of a political speech during which one (or more) candidates is addressing a particular political issue. For example, a scene of a debate may include a complete question set forth by a moderator and the answers and rebuttals of each candidate participating in the debate. To determine the beginning of the scene, a location of the start of a moderator's question may be determined, and to determine the end of the scene, a location of the start of the moderator's next question may be determined, such that the search system 1130 may back up until the end of the last candidate's comments prior to the next question.

The political speech video is cropped to include the discussion of the political issue by the political candidate in order to create a political issue video trailer for the candidate (1570). In some implementations, none, or a very small portion of, content from within the political speech that is not within the scene may be included in the political issue video trailer. Alternatively, the search system 1330 may provide a reference or pointer to the scene that includes the discussion of the political issue by the political candidate so that the scene may be perceivable to a user without requiring the user to view the entire full speech or debate and without cropping the video.

The search system 1130 determines whether there are additional candidates speaking within the speech (1580). To do so, the search system 1130 may access metadata or a title associated with the speech (e.g., a speech entitled "A Debate Between Candidate A and Candidate B" may indicate that the speech includes discussion of political issues by two candidates). If so, the process 1530-1570. If not, the process ends.

In some implementations, entity extraction may be used to detect information within a document, such as, for example, to detect movie quotes in a web page. Entity extraction may be used to identify names, places, dates, and other words and phrases that establish the meaning of a body of text, such as, for example, a web page. More particularly, by locating particular information related to a topic (e.g., movies), a concept associated with a document may be extracted, and thus, the document may be deemed to include a relationship to the topic (e.g., a web page may be deemed to include a movie reference).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer-implemented method performed by one or more processors configured with executable instructions to perform acts comprising:
   receiving, from a user, a query comprising a movie quote;
   identifying a movie associated with the movie quote;
   accessing a transcript of the movie;
   identifying a location within the transcript of the movie that corresponds to the movie quote; and
   providing a movie trailer for playback in response to the query, the movie trailer comprising a portion of the movie that includes the movie quote.

2. The method of claim 1, further comprising:
   identifying a first location within the movie prior to the movie quote;
   identifying a second location within the movie after the movie quote; and
   creating the movie trailer comprising a portion of the movie between the first location and the second location.

3. The method of claim 2, further comprising storing the created movie trailer in a database that is accessible for future queries.

4. The method of claim 2, wherein the first location is associated with a beginning of a scene in the movie and the second location is associated with an end of the scene in the movie.

5. The method of claim 1, wherein the movie trailer is created in real time in response to receiving the query comprising the movie quote.

6. The method of claim 1, wherein identifying the location within the movie that corresponds to the movie quote comprises:
   performing speech-to-text processing on an audio track of the movie to create the transcript; and
   searching the transcript based on the query.

7. The method of claim 1, wherein identifying the movie associated with the movie quote comprises:
   identifying a plurality of movies associated with the movie quote;
   determining a number of references to the movie quote associated with each of the plurality of movies; and
   identifying the movie of the plurality of movies associated with the greatest number of references to the movie quote.

8. The method of claim 7, further comprising providing two or more movie trailers in response to the query, based on two or more of the plurality of movies, wherein each of the two or more movie trailers includes the movie quote.

9. The method of claim 8, further comprising providing a value associated with each of the two or more movie trailers that indicates the popularity of the two or more movie trailers.

10. The method of claim 1, wherein providing the movie trailer in response to the query comprises sending a multimedia file comprising the movie trailer to the user that provided the query.

11. A system comprising at least one processor and a storage medium that stores a plurality of instructions, the plurality of instructions being executable by the at least one processor to cause the at least one processor to perform acts comprising:
   receiving, from a user, a query comprising a movie quote;
   identifying a movie associated with the movie quote;
   accessing a transcript of the movie;
   identifying a location within the transcript of the movie corresponding to the movie quote; and
   providing a movie trailer for playback in response to the query, the movie trailer comprising a portion of the movie that includes the movie quote.

12. The system of claim 11, the acts further comprising:
   identifying a first location within the movie prior to the movie quote;
   identifying a second location within the movie after the movie quote; and
   creating a movie trailer comprising a portion of the movie between the first location and the second location.

13. The system of claim 12, the acts further comprising:
   storing the created movie trailer in a database that is accessible for future queries.

14. The system of claim 12, wherein the first location is associated with a beginning of a first scene in the movie and the second location is associated with an end of a second scene in the movie.

15. The system of claim 11, wherein the movie trailer is created in real time in response to receiving the query comprising the movie quote.

16. The system of claim 11, wherein identifying the location within the movie corresponding to the movie quote comprises:
   creating the transcript by performing speech-to-text processing on an audio track of the movie; and
   searching the transcript associated with the movie based on the received query.

17. The system of claim 11, wherein identifying the movie associated with the movie quote comprises: identifying a plurality of movies associated with the movie quote; determining a number of references to the movie quote associated with each of the plurality of movies; and identifying the movie associated with the greatest number of references to the movie quote.

18. The system of claim 17, the acts further comprising:
   providing two or more movie trailers in response to the query, based on two or more of the plurality of movies, wherein each of the two or more movie trailers includes the movie quote.

19. The system of claim 18, the acts further comprising:
   providing a value associated with each of the two or more movie trailers that indicates the popularity of the two or more movie trailers.

20. The system of claim 11, wherein providing the movie trailer in response to the query comprises sending a multimedia file comprising the movie trailer to the user that provided the query.

* * * * *